(12) United States Patent
Salerno

(10) Patent No.: US 7,658,834 B2
(45) Date of Patent: Feb. 9, 2010

(54) METHOD AND APPARATUS FOR GENERATING HYPOCHLOROUS ACID (HOCL)

(76) Inventor: Mark Salerno, 13 Harmony Rd., Huntington, NY (US) 11743

( * ) Notice: Subject to any disclaimer, the term of this patent is extended or adjusted under 35 U.S.C. 154(b) by 725 days.

(21) Appl. No.: 11/134,054

(22) Filed: May 20, 2005

(65) Prior Publication Data

US 2006/0054510 A1    Mar. 16, 2006

Related U.S. Application Data

(60) Provisional application No. 60/573,579, filed on May 21, 2004.

(51) Int. Cl.
  *C25B 1/26* (2006.01)
(52) U.S. Cl. .............. 205/556; 205/500; 204/228.3; 204/228.6
(58) Field of Classification Search ......... 205/498–505, 205/556; 204/228.3, 228.6
  See application file for complete search history.

(56) References Cited

U.S. PATENT DOCUMENTS 6,719,891 B2 * 4/2004 Ruhr et al. ............... 205/500
6,998,057 B2 * 2/2006 Ferguson et al. ......... 210/739

* cited by examiner

*Primary Examiner*—Arun S Phasge
(74) *Attorney, Agent, or Firm*—Gerald T. Bodner

(57) ABSTRACT

A hypochlorous acid generator includes a brine tank for holding salt and a brine solution, the brine tank having a water inlet in fluid communication with a source of pressurized water, a brine solution outlet and a salt fill port to allow salt to be added to the brine tank. The generator also includes an anode chamber in fluid communication with the brine solution outlet of the brine tank for receiving brine solution therefrom, and for generating anolyte, the anode chamber having an outlet for providing hypochlorous acid therefrom, and a cathode chamber in fluid communication with the brine solution outlet of the brine tank for receiving brine solution therefrom and for generating catholyte. The generator further includes a catholyte recirculating pump in fluid communication with the cathode chamber and the anode chamber, the recirculating pump being responsive to a control signal to recirculate catholyte generated by the cathode chamber to the anode chamber.

45 Claims, 13 Drawing Sheets

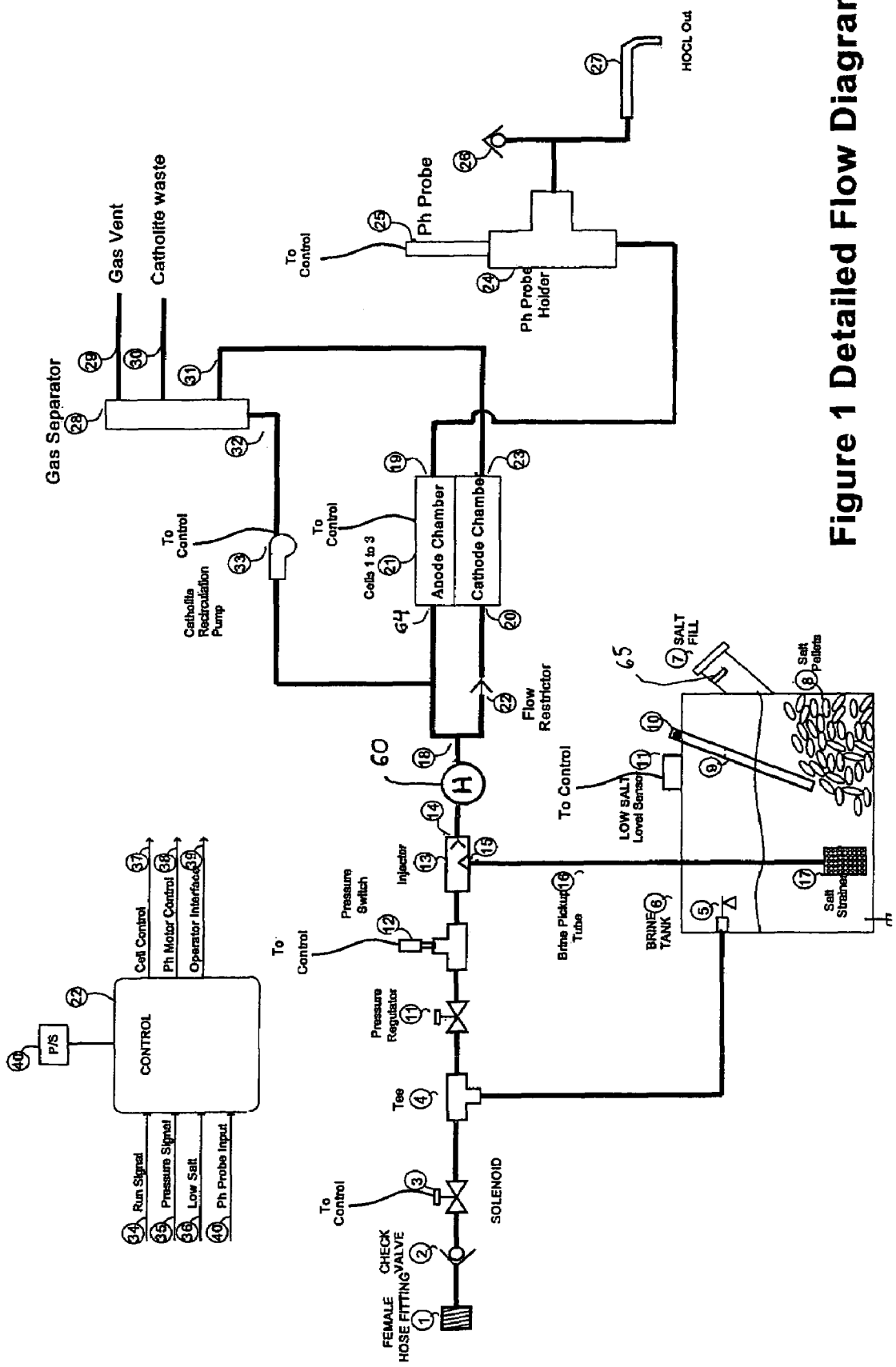
Figure 1 Detailed Flow Diagram

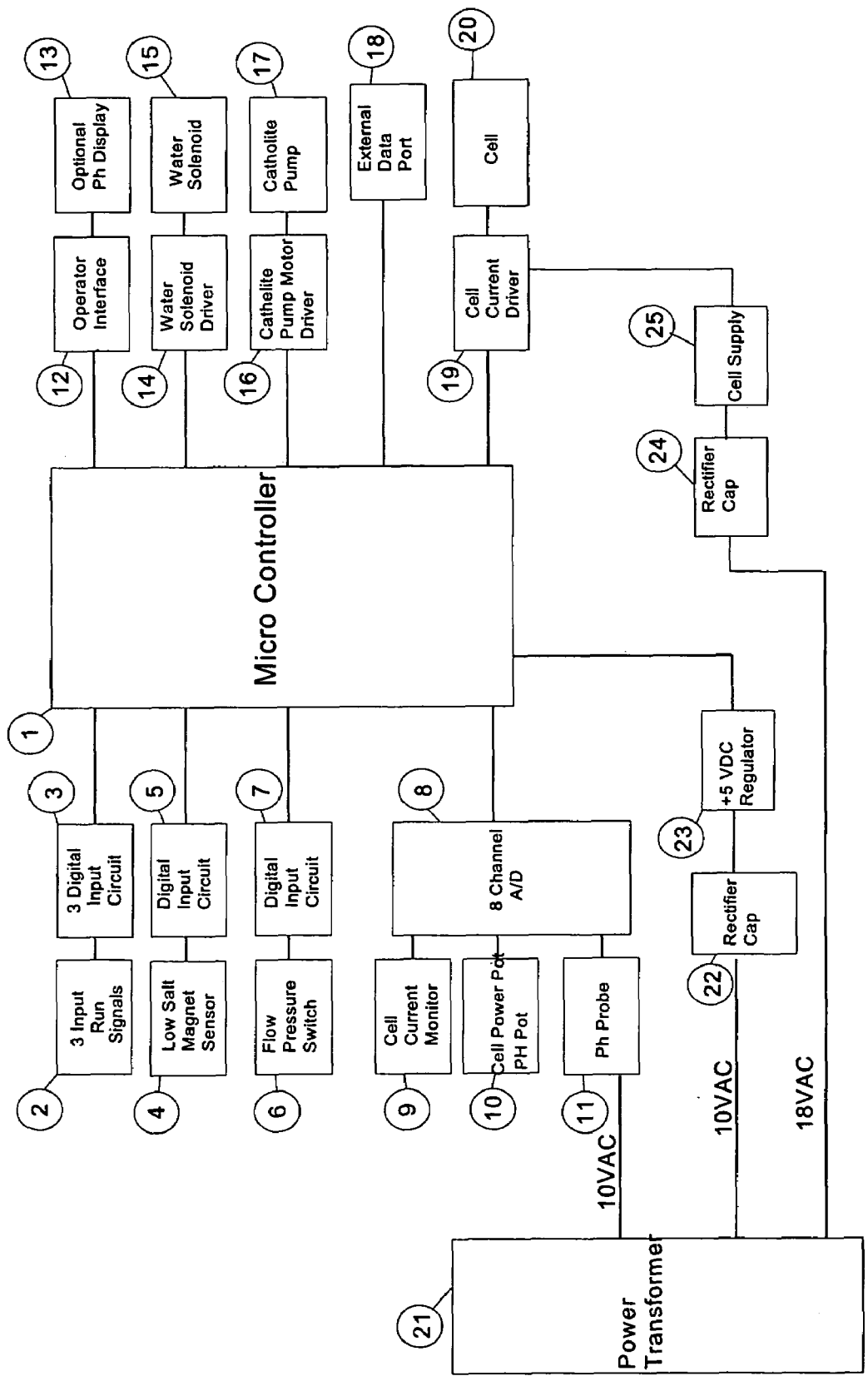
Figure 2 Control Block Diagram

Figure 3 a Control Schematic Sheet 1
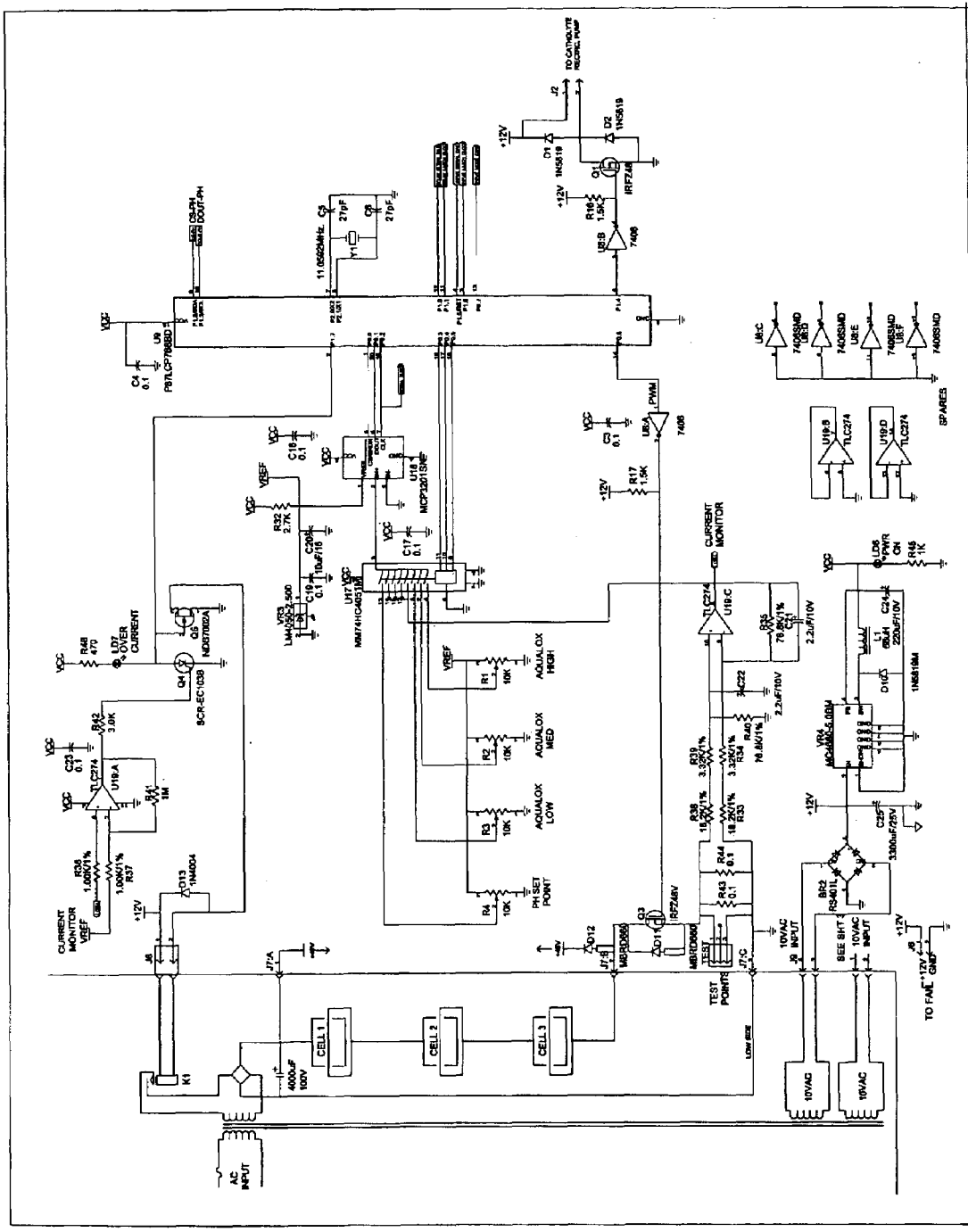

Figure 3 b Control Schematic Sheet 2
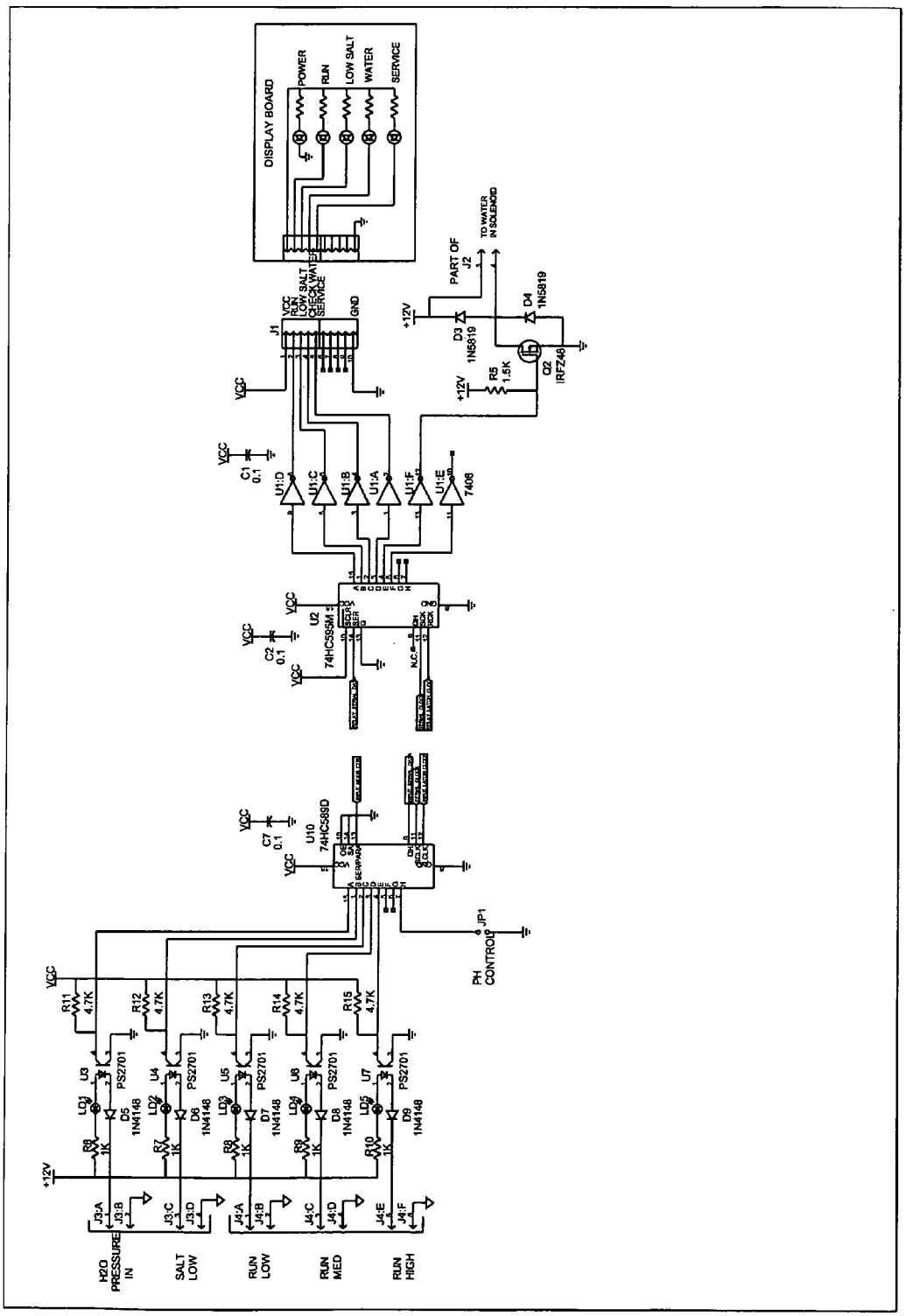

Figure 3c Control Schematic Sheet 3
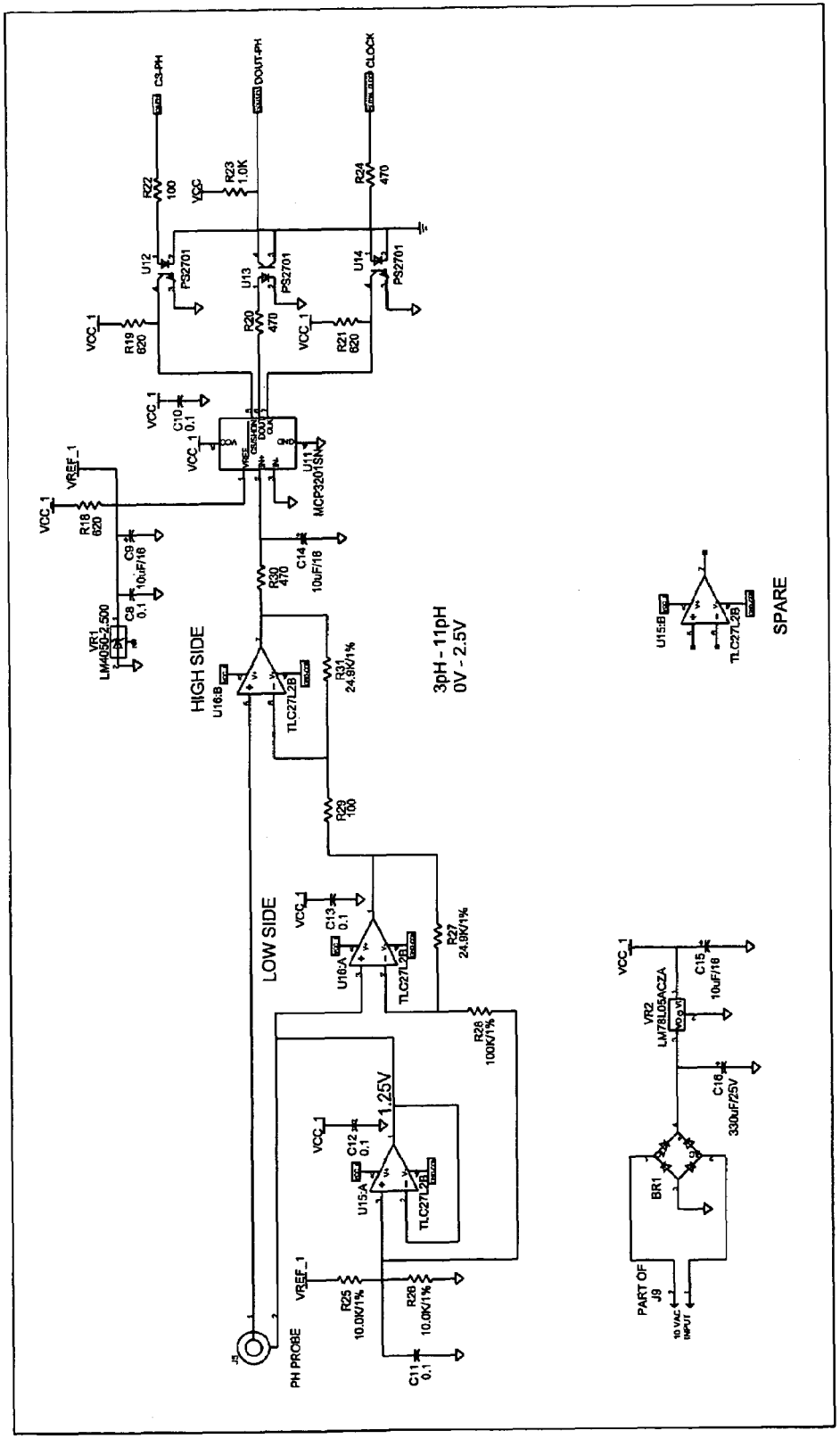

FLOW DIAGRAM
MULTI-FLUID SEQUENCER DIVERTER

MULTI-FLUID SEQUENCER DIVERTER CONTROL

CONSTRUCTION OF GENERATOR

CONSTRUCTION OF GENERATOR
REAR VIEW

SALT FLAPPER AND SENSOR ASSEMBLY

PH PROBE PIPING ASSEMBLY

SEPARATOR PIPING ASSEMBLY

MAIN HYDRAULIC PIPING ASSEMBLY

OPERATOR INTERFACE**

US 7,658,834 B2

METHOD AND APPARATUS FOR GENERATING HYPOCHLOROUS ACID (HOCL)

CROSS-REFERENCE TO RELATED APPLICATIONS

This application is related to U.S. provisional application Ser. No. 60/573,579, filed on May 21, 2004, and entitled "Method and Apparatus for Generating Hypochlorous Acid (HOCL)", the disclosure of which is incorporated herein by reference. This application claims the benefit of priority under 35 U.S.C. 119 to the aforementioned related provisional application.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of Invention

This invention relates generally to devices that convert salt solutions to hpochlorous acid (HOCL) and more specifically to the method of generating saline, the generator construction techniques and the holding and dispensing of the HOCL solution.

2. Description Of The Prior Art

Hypochlorous acid is used as a disinfectant in the food industry to kill microbiological contamination on food, preparation surfaces, in ice machines and flower containers. It is also used in food wash water and sprayed on fruits, vegetables and fish as a safe disinfectant. The effectiveness of the solution is greatly dependent on keeping the Ph between 6.0 and 7.5.

A current device in the industry is designed as an integrated three-tank system using pumps and sensors to move the fluid from tank to tank. This device is expensive and inflexible. Therefore it would be advantageous to eliminate the saline tank and associated pumps and sensors and separate the hypochlorous acid tank to lower cost and increase flexibility for the user.

A current device in the industry provides a first tank that contains a saturated brine solution that is made by soaking salt pellets in water, monitoring the water level and replacing the water as the brine is used. The current method uses a solenoid valve, level sensor and a control to accomplish this. This method is expensive. Therefore it would be advantageous to replace the sensor, solenoid valve and control function with a float valve that automatically and slowly replaces the water as the brine is pulled from the tank.

A current device in the industry provides the brine tank with a lid and hinges that allow the user to put salt pellets into the brine tank. The brine lid requires a sensor to turn off high voltage to the system for safety reasons. This method is expensive. Therefore it would be advantageous to provide a screw-on cap large enough to insert pellets but can be mechanically guarded so users cannot touch the brine solution.

A current device in the industry provides a salt pellet level sensor that detects the presence of salt pellets and informs the user that the salt pellets need to be replaced. The current sensors are expensive or unreliable. Therefore it would be advantageous to provide a piece of plastic mounted on a hinge to form a flapper that would be pushed back by the salt pellets. The plastic flapper would have a magnet mounted on it. A magnet sensor would be mounted on the outside of the tank and would detect that the flapper is in the down position indicating that salt needs to be replaced.

A current device in the industry provides two solenoids to control the water into the system and pumps to move the fluid through the cells. Therefore it would be advantageous to use one solenoid and the incoming water pressure to move the fluid through the cells.

A current device in the industry uses pumps and needle valves to adjust and maintain a fixed flow of water through the cell. This method is expensive. Therefore it would be advantageous to provide a balanced pressure regulator to control the incoming water pressure and an adjustable orifice that is used to provide controlled flow to the cells.

A current device in the industry does not check if saline is flowing into the cells. The electrochemical reaction causes the cell to overheat and burn out. Therefore it would be advantageous to monitor the water pressure at the output of the regulator or monitor the water flow to insure that there is fluid flow through the system to prevent the cells from burning out.

A current device in the industry provides a second tank that contains a saline solution that is made by pumping brine solution for a timed period into the saline tank and adding water with a solenoid valve for a timed period. The time the pump and water is on creates the proper concentration of salt in the water. This solution is called saline. Three sensors, a pump, a solenoid valve and a control accomplish this. This method is expensive and does not make evenly mixed saline solution. Therefore it would be advantageous to eliminate the saline tank, pump sensors and control and use the incoming water pressure and a venturi to suck the brine from the brine tank and evenly mix the water and brine through the venturi meter port making saline.

A current device in the industry provides a pump that is used to move the saline into two chambers of the cell called the anode chamber and cathode chamber. The amount of saline that is pumped in the cathode chamber is 1/10 of the flow through the anode chamber. The current method uses a pinch valve to accomplish this. This method is expensive and requires adjustment. Therefore it would be advantageous to replace the pinch valve with a plastic restrictor drilled to the correct diameter to maintain the 1/10 flow through the cathode chamber.

A current device in the industry provides a constant current source to the cells. An electrochemical process takes place converting the salt and water to a solution of hypochlorous acid (HOCL). The resulting untreated hypochlorous acid solution from the anode chamber is called anolite and it has a low Ph. The resulting solution from the cathode side is called catholyte and has a high Ph. The output hypochlorous acid solution Ph is adjusted by re-cycling the high Ph cathode solution back into the anode chamber with a pump bypass pinch valve, a modulated solenoid valve and control. A control senses the Ph with a Ph probe and the control modulates a solenoid valve to control the Ph to the desired set point. This method is expensive and requires a pinch valve adjustment. Therefore it would be advantageous to eliminate the solenoid valve, pinch valve and large single speed pump and provide a smaller dc motor speed controlled pump to meter the catholyte that is pumped into the anode chamber to control Ph. The control reads the Ph using the Ph probe and applying a PID control function output a proportional Pulse Width Modulated signal to the DC pump motor.

A current device in the industry contains a Ph probe that is held in a machined part that minimizes the turbulence around the Ph probe for more stable readings. Therefore it would be advantageous to eliminate the expensive machining of the Ph probe holder and use commonly available fittings to construct the Ph probe holder.

A current device in the industry contains a molded gas separator. The electrochemical reaction of the system generates hydrogen gas with the catholyte as a by-product. The gas needs to be separated and vented. The current gas separator is a molded part that is expensive to produce. Therefore it would be advantageous to build the gas separator with commonly available fittings.

A current device in the industry contains piping and a fan to vent the hydrogen gas from the system. Therefore it would be advantageous to vent the gas out the back directly from the gas separator and provide a fitting that will prevent the user from attaching any tubes.

The current system contains a third internal tank that holds a fixed amount of hypochlorous acid (HOCL) solution. Different applications may require a much smaller tank or a much larger tank. This method does not allow flexibility in tank size or the tank placement location. Therefore it would be advantageous to separate the holding tank from the generating system and provide multiple external tank sizes required to meet the needs of various users.

A current device in the industry contains a single holding tank that holds only one concentration of fluid. The user selects the concentration of the hypochlorous acid (HOCL) required with the operator interface. When the HOCL fluid selected is different from the HOCL fluid concentration that is currently in the holding tank, the device dumps the old fluid of HOCL and refills with new HOCL solution at the selected concentration. This method is expensive and inefficient and wasteful of energy and time. Therefore it would be advantageous to provide three separate holding tanks containing low, med and high concentrations of fluid that could be simultaneously dispensed by several users.

A current device in the industry requires the user to manually set the different concentrations of HOCL with the operator interface. Therefore it would be advantageous to provide a multi-fluid sequencer diverter device that automatically signals the generator to provide one of three concentrations of fluid and then diverts the HOCL fluid from the generator into the separated appropriate holding tanks. All holding tanks are automatically kept full using a fluid level switch in each tank allowing users to dispense all concentrations at any time.

A current device in the industry requires the user to press keys to start the dispensing process. Therefore it would be advantageous to provide each external tank with spigots or on demand pumps for the user to more easily dispense fluid.

A current device in the industry provides the system with a fixed number of cells. Every user is required to purchase a three-cell system. Therefore it would be advantageous to provide options of one, two or three cells to lower the cost of the system for users that require less than three cells.

These and other objects, features and advantages of the present invention will be apparent from the following detailed description of illustrative embodiments thereof, which is to be read in connection with the accompanying drawings.

OBJECTS AND SUMMARY OF THE INVENTION

It is an object of the present invention to provide a brine tank that contains a float valve to automatically and slowly replaces the water taken from the brine tank.

It is another object of the present invention to provide the brine tank with a screw on cap large enough to easily place salt pellets inside the brine tank but may be internally guarded so users cannot place their hand inside to touch the water.

It is yet another object of the present invention to provide a system that contains a salt flapper and magnet sensor that would detect when the salt pellets have melted into the brine solution and tell the user pellets need to be replaced.

It is a further object of the present of the invention to provide a system that contains a single water inlet solenoid and the incoming water pressure to move the fluid to the cells.

It is an object of the present invention to provide a system that contains a balanced pressure regulator and a venturi input orifice to maintain constant flow through the cells.

It is another object of the present invention to provide a pressure switch or flow switch that monitors the incoming water flow or pressure and will not allow power to the cells if the pressure or water flow is removed insuring the cells will not burn out.

It is yet another object of the present of the invention to provide a system that uses the incoming water pressure and a venturi to suck the brine from the brine tank and evenly mix the brine and fresh water to make saline.

It is a further object of the present invention to provide a system that would contain a catholyte flow restrictor to automatically limit the flow through the cathode chamber to $\frac{1}{10}$ the flow of the anode chamber.

It is an object of the present invention to provide a dc pump to meter the catholyte re-circulation back into the anode chamber to control Ph.

It is another object of the present invention to provide a Ph probe holder made from commonly available ½ inch PVC threaded pipefittings it is yet another object of the present invention to provide a gas separator made from commonly available ⅜ inch PVC threaded pipe fittings.

It is yet another object of the present invention to provide a gas port made from a modified ¼ inch barb fitting.

It is a further object of the present invention to provide a holding tank that is separated from the generator and that can be sized to meet the requirements of each user.

It is an object of the present invention to provide multiple tanks holding different concentrations of HOCL fluid that is always available and can be accessed simultaneously by several users.

It is another object of the present invention to provide a Multi Fluid Sequencer Diverter device that is placed between the generator and three holding tanks. Each tank provides a low fluid signal to the sequencer and the sequencer commands the generator to make one of three concentrations of fluid and then diverts the fluid to the appropriate tank. The sequencer automatically keeps all tanks full with the correct concentrations of HOCL fluid.

It is yet another object of the present invention to provide the dispensing tanks with spigots or on demand pumps and hoses that allow the user to easily dispense fluids.

It is yet a further object of the present invention to provide multiple run input signals into the generator to signal the generator to run at one concentration of HOCL.

It is an object of the present invention to provide a check valve on the output of the system that will allow the hypochlorous acid to drain from the output tube without siphoning brine from the brine tank.

It is another object of the present invention to provide a control system with one FET that provides a constant current source by a Pulse Width Modulated (PWM) closed loop Proportional Integrated Derivative (PID) control system.

It is yet another object of the present invention to provide a control system that reads a Ph probe and using a PID control and adjust the speed of a DC motor pump using Pulse width modulation to keep the Ph at the desired level.

It is yet a further object of the present invention to provide a control system that reads an input from a dispenser or external device and runs the generation process.

It is an object of the present invention to provide a control system that has an operator interface consisting of indicators of Power, Run/Standby, Service, Low Salt and optional Ph display.

It is another object of the present invention to provide a generator that has the ability to hold one, two or three cells and the power supply optimally sized for the number of cells it contains.

It is yet another object of the present invention to provide a generator that has the ability to easily change the flow rate of the system by changing the orifice in the venturi.

In accordance with the present invention a non-snap action float valve is provided to replace the water taken from the brine tank. This method lowers the cost of the system and eliminates sensors and a water solenoid and improves the making of brine by slowly replacing the fluid in the brine tank.

The improved HOCL generator includes a brine tank with a large screw on cap that holds salt pellets and brine solution. The salt fully saturates in the incoming water making brine. A hand guard is placed into the tank to prevent the user from touching the brine solution. The brine solution is conductive and may pose a shock hazard. This feature eliminates costly lids, hinges, sensors and safety circuit that turns the power off.

The improved HOCL generator includes a brine tank that contains a salt flapper that is suspended by a plastic rod at the top of the tank. It contains a magnet above the hinge. On the outside of the tank a magnet sensor is provided. When salt pellets are added, the pellets push the flapper back away from the magnet sensor. When the salt melts the flapper swings down causing the magnet to engage the magnet sensor. The control lights a low salt indicator LED informing the user the salt needs to be replaced. This object significantly reduces the cost of the salt low sensor.

The salt flapper length and position are critical in the system. The length has been designed to allow several inches of salt to remain on the bottom of the tank. This feature allows the user time to refill the system with salt. If the system runs out of salt, the brine salt concentration will fall and the system will not operate properly.

The salt flapper also acts as a shield to stop the salt pellets from pushing the float valve up preventing water from entering the system. The salt flapper contains sides that are bent slightly in. This allows the flapper to extend right to left and provide more shielding from the salt pellets but is still able to fit into the salt fill hole.

Fresh water is supplied to the input of the system to the main water assembly. The main water assembly includes a check valve to prevent back flow into the potable water.

The improved HOCL generator includes a solenoid valve that controls the fresh water supply to the entire system. The output of the solenoid is piped to a Tee connector that feeds the brine tank float valve and the pressure regulator. The water feed tube is placed after the solenoid to insure that when the power to the system is off water will not flow to the brine tank.

The improved HOCL generator includes a balanced pressure regulator and venturi. The pressure regulator holds the pressure constant at the input of the venturi. The regulated pressure and the small flow orifice of the venturi provide a constant water flow to the cells.

The improved HOCL generator includes a pressure switch or flow switch that is positioned at the output of the pressure regulator. When the switch senses pressure or flow power to the cell current is allowed to engage. This feature insures that saline or water will run through the cells when power is applied preventing them from burning out. The position of the switch at the output of the regulator allows a lower pressure, lower cost device to be used because it always sees a regulated pressure.

The improved HOCL generator includes a venturi. The venturi is positioned at the output of the pressure switch. The venturi uses the Bernoulli principal that creates a vacuum when water flows from the smaller input port to the larger output port. The expansion of the water creates the vacuum. A small orifice is placed at the vacuum site, which is connected to a brine pick-up tube. The atmospheric pressure then pushes the brine up the tube and into the venturi water stream. This feature lowers the cost and size of the system by eliminating the saline tank, three sensors, a pump and a high cost solenoid valve.

The venturi contains a flow adjustment screw that adjusts the port opening. The pressure regulator venturi port combination feature allows the flow of the water to the cells to be accurately and consistently controlled thereby insuring the cells will produce consistent HOCL.

The venturi meter port contains a screw or adjustable port opening to control the amount of brine that is to mix with the fresh incoming water. This feature insures an even mix of brine with water and lowers the system cost of making saline and makes the system smaller.

The improved HOCL generator provides a catholyte flow restrictor that is placed at the input of the cathode chamber. The output of the venturi is piped to a wye connection that goes to the anode chamber and cathode chamber of the cells. The pipe that goes to the cathode chamber contains the restrictor that is sized so only $\frac{1}{10}$ the flow of the anode chamber will flow into the cathode chamber. This feature lowers cost and has a smaller size then a pinch valve and requires no adjustment.

The improved HOCL generator includes a DC motor speed controlled pump that recirculates catholyte back to the anode chamber of the cell to control Ph. An electrochemical process takes place in the cells converting the salt and water to a solution of hypochlorous acid (HOCL). The resulting untreated hypochlorous acid solution from the anode chamber is called anolyte and it has a low Ph. The resulting solution from the cathode chamber is called catholyte and has a high Ph. The hypochlorous acid solution's Ph that comes from the anode chamber is adjusted by recirculating the high Ph cathode solution back into the anode chamber of the cell. The speed of the pump meters the catholyte back into the anode chamber. This feature is smaller and less costly and has a more even Ph control than the existing systems.

The improved HOCL generator system includes a Ph probe holder made from standard compression fittings and ½ inch PVC pipe. The Ph probe senses the Ph in the output stream of fluid. The fluid flowing by the probe needs to be free of bubbles and turbulence. The probe holder is made with a ½ inch tube compression fitting that holds the probe. The compression fitting screws into one straight end of ½ inch PVC Tee fitting and the input fluid comes from the other straight end. The fluid goes out the right angle side of the Tee fitting. This assembly lowers the cost of the probe holder, allows the probe to be easily sealed into the output fluid stream and allows for easy Ph probe field replacement.

The improved HOCL generator system includes a gas separator assembly made from ⅜-inch PVC pipe fittings. This assembly allows the gas to vent out the top and the catholyte to be recovered at the bottom. The output of the cathode chamber is piped into the second port from the bottom. The gas bubbles to the top and is vented out the back of the system through an elbow fitting. The separated catholyte is recovered from the bottom port. Any catholyte that is not recirculated for Ph control is vented to the third port from the bottom out the back of the system as waste. This device is cheaper then the existing device because it uses common PVC pipefittings.

The improved HOCL generator system includes a modified gas port. It is made, by cutting a ¼ inch barb elbow fitting so some of the elbow remains in place. This feature makes it hard for a user to place a tube over the gas port insuring the gas will be vented out the unit.

The improved HOCL generator includes a separated HOCL holding tank sized to meet the user's requirements. If the user requires only several quarts of fluid a day, the tank is sized smaller. If the user requires 25 gallons of fluid the tank needs to be bigger. This feature allows the separated holding tank to be sized and placed in convenient locations such as under a sink or near a work area or on a shelf. The tanks include a fluid input port, a fluid output port and a fluid level switch. When the tank fluid level switch closes the generator will run until the fluid level switch closes. This feature insures HOCL fluid is always available in the dispensing tanks.

The improved HOCL generator system includes multiple HOCL holding tanks. Each tank holds a different concentration of HOCL fluid (Low, Med, High). This feature insures all concentrations of HOCL fluid is available to users and the users can simultaneously dispense fluid from the tanks The improved HOCL generator system includes a Multi-Fluid Sequencer Diverter device called a sequencer. The HOCL generator's fluid output and the generators three run signals are connected to the input of the sequencer. The sequencer has three fluid output connections that attach to the three separate HOCL fluid holding tanks. The sequencer has three low fluid level inputs from the HOCL tanks. When fluid is drawn from a tank and the tank fluid level switch closes, the sequencer signals the generator to run at the required concentration and opens one of three internal diverter valves. The fluid is then diverted to the correct tank, which contains a different concentration of HOCL fluid. When multiple tanks call for fluid, the sequencer will run for a period of time and then switch or sequence to the next tank. This feature allows one generator to supply three separate holding tanks with different concentrations of HOCL fluid.

The improved HOCL generator includes spigots or on-demand pumps and hoses on the dispensing tanks. The user pulls or twists the spigot to dispense fluid into small containers. If high dispense rates are required, an on demand pump is attached to the output of the HOCL container. A hose is attached to the output of the pump with a shutoff valve on the end of the hose. When the user opens the valve, the pressure in the hose drops and the pump automatically turns on. This feature allows the user to easily dispense fluid.

The improved HOCL generator system includes three or more inputs called run signals. They signal the generator to generate a specific HOCL concentration. The run inputs may be set to generate low, med, and high HOCL concentrations. The run inputs may also be set to generate two of the same concentrations to be placed in tanks using the Multi-Fluid Separator Diverter in separated locations. This feature allows one small generator to make several concentrations of HOCL fluid.

The improved HOCL generator system includes a check valve vent at the output of the system. If the output tank is lower than the generator and the power is off, the output tube causes the brine to siphon from the brine tank. The check valve prevents this by opening and allowing the output tube to vent air and clear the line of fluid. This insures brine will not siphon out and through the system when the water solenoid is turned off.

The improved HOCL generator system includes a control system that uses a single FET with catch diodes to control the current through the cells. The current is monitored though a current sensing resistor connected to ground. An A/D converts the voltage across the current sense resistor and feeds it to a microcontroller. The microcontroller uses a Proportional Integrated Derivative (PID) control loop to adjust the Pulse Width Modulated (PWM) signal to the power FET. This control loop feature insures a tight control of current even if the impedance of the cells change.

The improved HOCL generator system includes a Ph control system that includes a very high impedance input circuit in an instrument amplifier configuration. An included microcontroller reads the amplifier using an A/D. The included Catholyte recirculation DC motor pump connects to a FET with catch diodes. Firmware running a PID algorithm detects the Ph of the output solution and determines the PWM percentage output to the DC motor pump. This feature is cost effective because it uses the minimum parts count and controls the Ph accurately.

The improved HOCL generator includes an optoisolated input that allows the generator to be connected to external systems. When the input is activated (shorted) the microcontroller reads the input and starts the generator. The operator interface indicates on the panel the generator is in the Run mode. When the signal is inactive (open) the operator interface indicates the generator is in standby mode. This circuit allows the generator to be connected to dispensers or devices that require intermittent generation of solution.

The improved HOCL generator includes an operator interface with led indicators and an optional Ph display. The Power display lights when power is applied, the Run/Standby indicator is Green for Run and Yellow for standby, the Low Salt indicator lights red when the control detects low salt from the low salt sensor, the red service led blinks in sequences when the control detects a problem, the Ph is displayed on the optional two digit numeric LED display. This simple operator interface allows the user to quickly determine the unit is operating properly.

The improved HOCL generator includes the option of supplying one, two, or three cells inside the generator. This allows the concentration and flow rate to be matched to the user requirements of an application. The HOCL concentration is dependent on the flow rate, conductivity and current flow through the cells. By calculating the highest concentration required, matching the peak fluid demand, the number of cells, the adjusted flow rate, and the current can be set for each users needs. This feature will optimize the cost of a generator by providing only the number of cells required for the application.

The improved HOCL generator system contains a fresh water clear feature. The venturi that mixes the brine and water is made of brass. When the salt solution sits at the output the salt oxidizes the brass. By pulsing the fresh water the venturi cannot generate the suction required to pull the brine into the fresh water. This causes fresh water to flush the output of the venturi insuring the venturi to remain free of oxidation.

These and other objects, features and advantages of the present invention will be apparent from the following detailed description of illustrative drawings.

BRIEF DESCRIPTION OF DRAWINGS

FIG. 1 is the detailed flow diagram for the improved apparatus for the hypochlorous acid generator.

FIG. 2 is the Block diagram for the control system for the HOCL generator.

FIG. 3a is sheet 1 of the schematic for the HOCL control system for the improved HOCL generator.

FIG. 3b is sheet 2 of the schematic for the HOCL control system for the improved HOCL generator.

FIG. 3c is sheet 3 of the schematic for the HOCL control system for the improved HOCL generator.

DETAILED DESCRIPTION OF THE PREFERRED EMBODIMENTS

Figure 4:
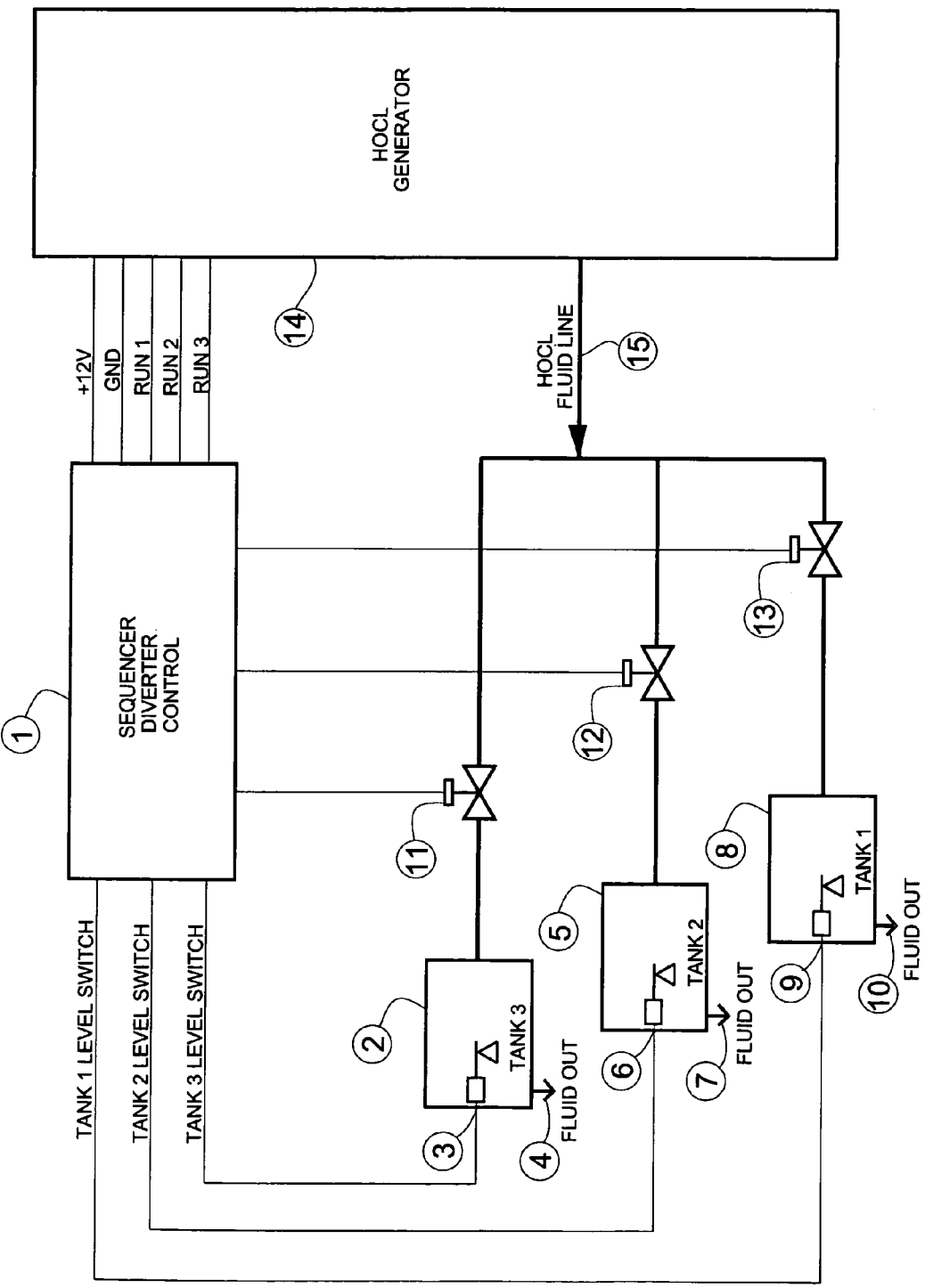
FIG. 4 is the flow diagram of the Multi Fluid Sequencer Diverter.

Top Level Description of Method and Apparatus for the HOCL Generator

FIG. 1 shows the detailed flow diagram of an apparatus for HOCL generation. The apparatus is made from tanks piping and tubing and cells to generate HOCL. The water enters the system and is regulated for pressure and flow. Brine is mixed with the water and is sent to the cells. A current passes through the cells and converts the H20 NACL solution to HOCL with a by-product of H. The resulting HOCL is Ph adjusted by recirculating cathode solution called catholyte back into the system. The HOCL is then placed into an external holding tank for dispensing. A multi-fluid sequencer diverter can be connected to the HOCL generator. The device monitors two or three holding tanks. When the tanks require fluid, the sequencer signals the generator to generate the required concentration of fluid and diverts the fluid to the proper tank.

Top Level Summary of Operation

When a dispenser or the sequencer calls for fluid, the generator control opens the fresh water solenoid valve, which starts the water flowing. The venturi sucks the brine from the tank and mixes it with the incoming water. The float valve lowers and replaces the brine with fresh water. The control checks that the pressure switch is closed and starts the current to the cells. The electrochemical reaction starts taking place and the resultant fluid is passed to the Ph probe. The control reads the Ph and adjusts the speed of the catholyte pump motor to correct the Ph. The HOCL is then piped to an external dispenser.

The salt level sensor is monitored and when the salt melts and the flapper falls an indicator informs the user to add more salt.

Detailed Description of the HOCL Generator

FIG. 1 shows the detailed flow diagram of an apparatus for HOCL generation. The water enters the system through the female hose fitting 1 at the back of the unit into a standard check valve 2. Water is piped to the input water solenoid 3 that controls the water flow into the system. The water is then piped to a Tee connector 4. The output of the Tee is sent to the brine float valve 5 mounted inside the brine tank 6. The placement of the Tee fitting insures when power is off to the solenoid 3 water will not flow to the brine tank.

The brine tank 6 consists of a plastic tank with a large screw on cap 7 to allow salt pellets 8 to be inserted. A hand guard, such as one or more radially extending fingers, baffles or walls 65, situated in the fill port or brine tank, prevents users from touching the brine solution held in the tank. The salt pellets push against the salt sensor flapper 9 causing the magnet 10 mounted on the salt flapper to move away from the salt sensor 11. The output of the low salt sensor 11 is connected to the control input 36. The control 22 uses the sensor to detect when the salt is low to display the low salt on the operator interface 39. When brine fluid is removed from the tank the float 5 lowers opening the valve and allowing water to drip into the brine tank 6.

The second output of the Tee connector 4 is piped to the pressure regulator 11. The pressure regulator keeps the pressure constant to the rest of the system insuring constant flow. The output of the pressure regulator 11 is piped to the pressure switch 12. The control input 35 uses the pressure switch 12 to sense when the solenoid 3 is open and there is fluid flow in the system. This prevents the control 22 from applying power to the cells 21 when there is no water flowing in the system. The position of the pressure switch 12 is on the output of the regulator 11 allowing a lower cost lower pressure sensor.

The output of the pressure switch 12 is piped to the venturi 13. The venturi has a water nozzle bushing that acts as a flow restrictor 14 that is used to control the flow to the cells. The pressure regulator 12 applies a constant pressure so the venturi creates a vacuum.

The meter port of the venture 15 is piped to a brine pickup tube 16. The brine pickup tube has a salt strainer 17 at the end and is placed into the brine solution of the brine tank.

As the water flows through the venturi, the water is compressed into a small orifice and then opens into a larger chamber. This causes a vacuum to occur in the larger chamber. The brine is pushed into the water stream by atmospheric pressure.

The meter port of the venturi 15 is adjusted by placing the properly sized tip into the meter port. The output fluid is then measured with a conductivity meter. The meter port size is then adjusted to the proper conductivity. Some flow rates require that the meter tip be made from a long capillary tube. The length of the tube causes the brine to be restricted into the fresh water stream. The length is then adjusted to get the correct conductivity.

The conductivity may be tuned by adjusting the pressure—flow of the water. The vacuum of the venturi remains fairly constant as the pressure is increased. The flow of brine becomes constant. If the amount of water is increased then the concentration of the brine will fall. Therefore the conductivity may be adjusted using the pressure regulator.

The output of the venturi is piped to a Wye connector 18. One port of the Wye 18 is piped to the anode chamber port 64 of the cells 21. The second port of the Wye 18 is piped to the cathode chamber port 20 of the cells 21. Inside the cathode pipe is a flow restrictor 22 that restricts the flow to the cathode port 20.

The cells 21 are wired to the control 22 with 10 awg wire 23. The current through the cells 21 is limited by the control 22.

The output of the anode chamber port 19 is piped to the Ph probe holder 24. The Ph probe 25 is connected to the control Ph probe input 40. The control reads the Ph probe to control Ph described below.

The output of the Ph probe holder 24 is piped to a Tee connector. One port is piped to the back of the unit 62 and the other port is piped to a check valve 26. The check valve closes when there is fluid flow in the system but opens if there is a vacuum. This prevents the brine from siphoning out the system when the power is off and the output tube 27 is lower then the brine tank.

The output of the catholyte chamber 23 is piped to the input port of the gas separator 28. The fluid contains hydrogen gas as the by-product of the electrochemical process of converting the H20 and the NACL into HOCL. The hydrogen gas bubbles up to the top of the gas separator and is vented out the gas port 29. The fluid from the cathode is called catholyte and is recovered from the catholyte output port 32 of the gas separator 28. The catholyte has high Ph and is used to adjust the Ph of the HOCL output fluid. Any catholyte that is not used for Ph adjustment flows out the waste port 30 of the gas separator 28.

The catholyte port 32 is piped into the input port of the catholyte recirculation pump 33. The recirculation pump motor 33 is 12 VDC and the controller 22 sets its speed at output driver 38. The amount of catholyte that is recirculated is continually adjusted by the control using the Ph probe 25 as the input and the speed as the output. The control uses a PWM method for controlling the speed 38 to the DC pump motor 33 and uses a PID algorithm for determining the speed required to adjust the Ph.

The system can also be used without the Ph probe. The control would set the speed of the motor and the user would be required to check the Ph externally. This would have applications in lower cost units.

The system contains three Run signal inputs 34 that are used when an external dispensing device calls for HOCL fluid. The system continues to run until the signal is removed. When the system first starts, the generator produces low concentration of HOCL for a short time. The control makes up for this by producing slightly higher HOCL for the same amount of time. This feature insures that the holding tank contains the proper concentration of HOCL.

The power supply 40 supplies the 5 volt power required to run the control 22 and the 15 volts @ 14 amp power for each cell 21.

For the electrochemical reaction which takes place in the anode and cathode chambers, it is desireable to provide the chambers with water having a predetermined and constant conductivity. The conductivity of the water is usually measured prior to or early in the beginning stages of the hypochlorous acid generation. In accordance with the present invention, one way to maintain the selected water conductivity during hypochlorous acid generation is to maintain a constant water temperature, as the conductivity of the water is dependent on its temperature.

Therefore, in accordance with the present invention, a coil heater 60 or the like may be placed in-line between the output 14 of the venturi 13 and the wye 18 input, between the pressure switch 12 and the venturi 13, between the pressure regulator 11 and the pressure switch 12, between the Tee fitting 4 and the pressure regulator 11, between the solenoid valve 3 and the Tee fitting 4, between the check valve 2 and the solenoid 3, or between the hose fitting (water inlet) 1 and the check valve 2, in order to heat and maintain at a substantially constant temperature the incoming water before the venturi 13, or the water-brine solution mixture after the venturi 13. Alternatively, the source of pressurized water provided to the water inlet 1 of the generator may be preheated and maintained at a constant temperature.

Top Level Summary of Control

FIG. 2 shows the block diagram of the control for an apparatus for HOCL generation. The basic functions of the control are:

External holding tank calls for fluid via one of the Run input signals 2 and digital input circuit 3.

Microcontroller 1 turns on water solenoid 15 which drives water through the system.

The Microcontroller provides a current with the cell driver 13 through the Cells 21 to generate HOCL. The Cell current is measured through the Cell current monitor 9 and A/D 8 using microcontroller 1. The current is kept constant at the Cell Power Potentiometer 10.

Ph is monitored with the Ph probe 11 and is adjusting by speed adjusting the catholyte pump driver 16 and the catholyte pump 17.

The microcontroller 1 monitors the salt level using a magnetic sensor 2 and digital input circuit 4 and indicates on the operator interface 12 when the salt needs replenishing.

The Power transformer 21 supplies isolated AC voltages to the Ph probe circuit 11, the microcontroller power supply 22, 23 and the Cell Power supply 24, 25.

The external data port 18 is used for programming and communication.

Detailed Description of the Control

FIG. 3*a*, 3*b*, 3*c* is the schematic of the HOCL generator.

Run Input Circuit—FIG. 3*b* U3-U7 and U10 are the run input signal chips. The optoisolators serve to level shift and isolate noise to the microcontroller. The Microcontroller polls the run inputs and when one of the inputs goes low the microcontroller starts the generation process at the rate selected. U5 signal runs the generator at the low level U6 signal runs the generator a the medium level U7 signal runs the generator at the High level.

Water Solenoid Circuit—On FIG. 3*b*, Q2 and D3,D4 is the water Solenoid driver. When one of the run signals energizes the microcontroller U1 pulls the gate of the FET high turning it on and energizing the water solenoid. This lets the fresh water flow to the system.

Pressure switch Circuit—On FIG. 3*b*, U3 is an optoisolator that isolates the pressure switch from the microcontroller for noise immunity. When the generator is generating HOCL the microcontroller reads the pressure switch and if the pressure switch is open the control generates a check water indicator on the operator interface condition. When the generator is not generating HOCL the microcontroller reads the pressure switch. If the switch is still closed, the microcontroller displays a service condition.

Cell Current Circuit—On FIG. 3*a* when the run Low signal is engaged the microcontroller reads the Low set point and starts sending a PWM signal to the Q3 transistor. D11 zener limits the voltage kick back that is applied by the inductance of the cells. Resistors R43 and R44 creates a voltage drop proportional to current. The voltage is amplified through U19 amplifier and sent to the A/D. The microcontroller U9 reads the A/D and converts the voltage to current. The microcontroller U9 compares the set point with the actual current using a PID algorithm and adjusts the PWM output accordingly. The potentiometers R3-R1 sets the current set point for the low, med and high solution.

Cell Safety Circuit—On FIG. 3a the analog voltage from the current sampling circuit U19c is fed into a comparator U19a. The comparator stays low when the current is below the absolute maximum current. When the current exceeds the maximum allowable current the comparator goes high. The output is fed to an SCR latch circuit. The latch circuit independent of the microcontroller U9, turns off power to the cells and the microcontroller flashes the service indicator. Cycling the power on and off resets the cell safety circuit.

Ph Probe Circuit—On FIG. 3c the Ph probe is a standard off-the-shelf Ph probe. Ph probes have an input impedance of 10 Megohms. The amplifier U15 has been chosen for its high impedance. The circuit consisting of U15, U16 is in a standard instrumentation amplifier that helps with common mode noise. The amplifier feeds an U11 12 bit A/D.

The Ph probe sits in the output stream of the HOCL fluid. The conductive nature of the HOCL places the cell voltages on the Ph probe. To insure the probe measures the Ph properly, an isolated power supply circuit of BR1 and VR2 and C15 is provided. The output of the A/D connected to the microcontroller through optoisolators U12-U14. The Ph probe voltage is then converted into Ph by the microcontroller.

The Ph set point is set by R4. The A/D reads R4 through the multiplexer U17.

Catholyte Recirculation DC Pump Circuit—On FIG. 3a the catholyte is recirculated with a speed controlled 12 VDC pump. The circuit consists of Q1 D1, D2 and U8b. The microcontroller U9 sends a Pulse width modulated signal to the pump through Q1. The average DC voltage varies causing the speed of the pump to change. The microcontroller U9 reads the Ph probe through Ports 1.3, P1.3 P0.2 and the set point and using a PID algorithm adjusts the PWM percentage accordingly.

Power Supply Circuit—On FIG. 3a the BR2, C25, VR4 D16 and L1 C24 make up the power supply circuit. It is a standard +5 volt switching regulator.

Operator Interface Circuit—On FIG. 3b the operator interface circuit consists of U2, U1 J1 and the led display board.

Detailed Description of the Multi-Fluid Sequencer Diverter

FIG. 4 is the flow diagram of the Multi-Fluid Sequencer Diverter called a sequencer. The sequencer monitors the fluid level with float switches 4,6,9 in the attached tanks 2,5,8. When the user draws fluid from a tank at 4,7,10 the sequencer control 1 signals the HOCL generator 14 to start running at the concentration set for that tank. The sequencer also energizes the proper valve 11,12,13 that diverts the HOCL fluid to the proper tank.

Detailed Description of the Multi Fluid Sequencer Diverter Control

Figure 5:
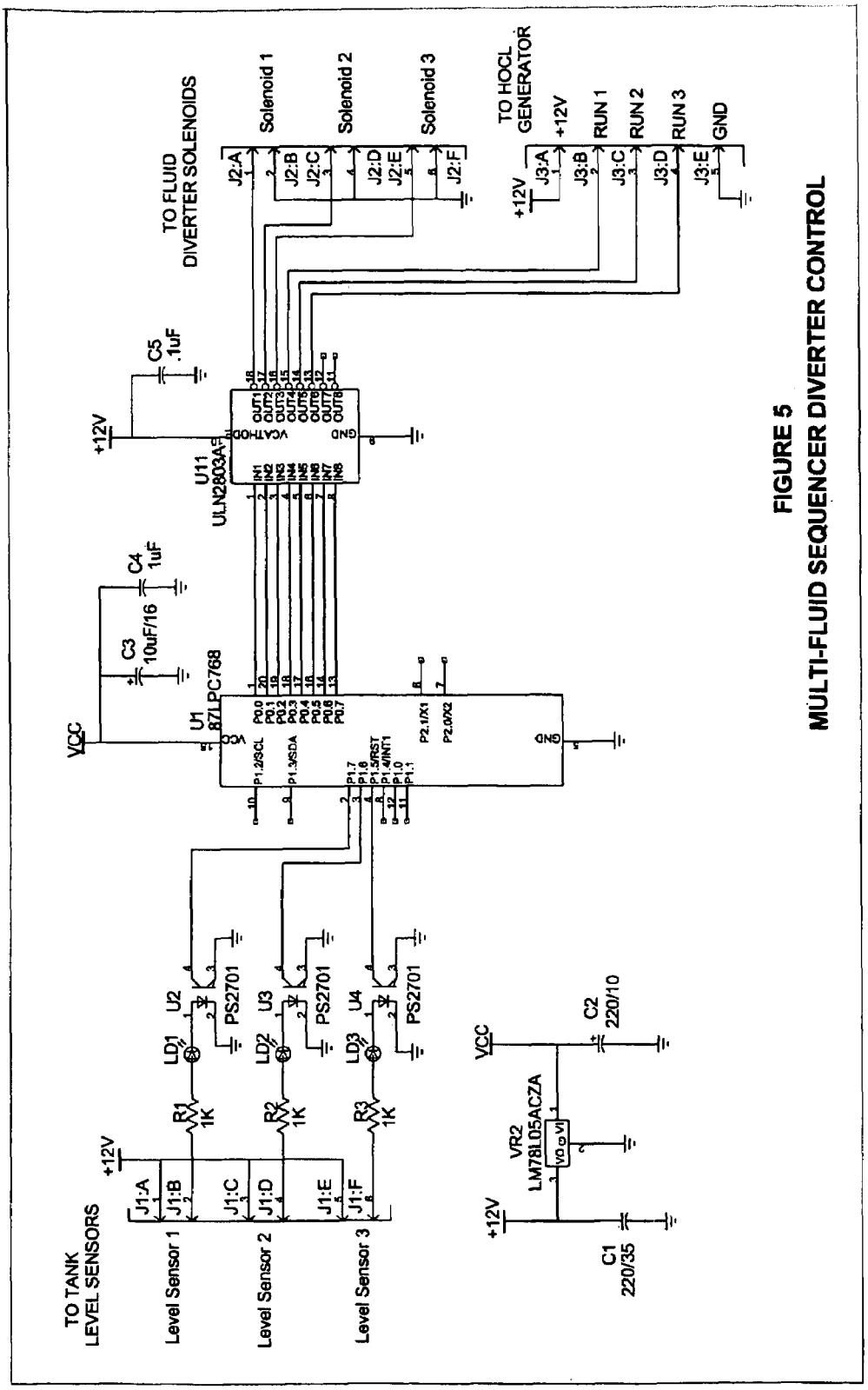
FIG. 5 is the schematic for the Multi Fluid Sequencer Diverter.

FIG. 5 is the schematic of the Multi Fluid Sequencer Diverter Control. The microcontroller 1 monitors the three tank level switches connected to J1. U2, U3, U4 level shift and isolate the external wires from the microcontroller. When the microcontroller 1 senses a low fluid level in a tank, the microcontroller 1 energizes the generator run output U11 outputs 1-4 and J2 and the diverter solenoid. The run signal U11 out 4-7 and J3 causes the generator to start generating HOCL at a fixed level and the solenoid diverts the HOCL fluid to the corresponding tank.

If several tanks are low and require fluid, the microcontroller will run for a time period then automatically switch to the next tank. This process will continue until all tanks are full.

Detailed Description of the Salt Flapper Assembly

Figure 7:
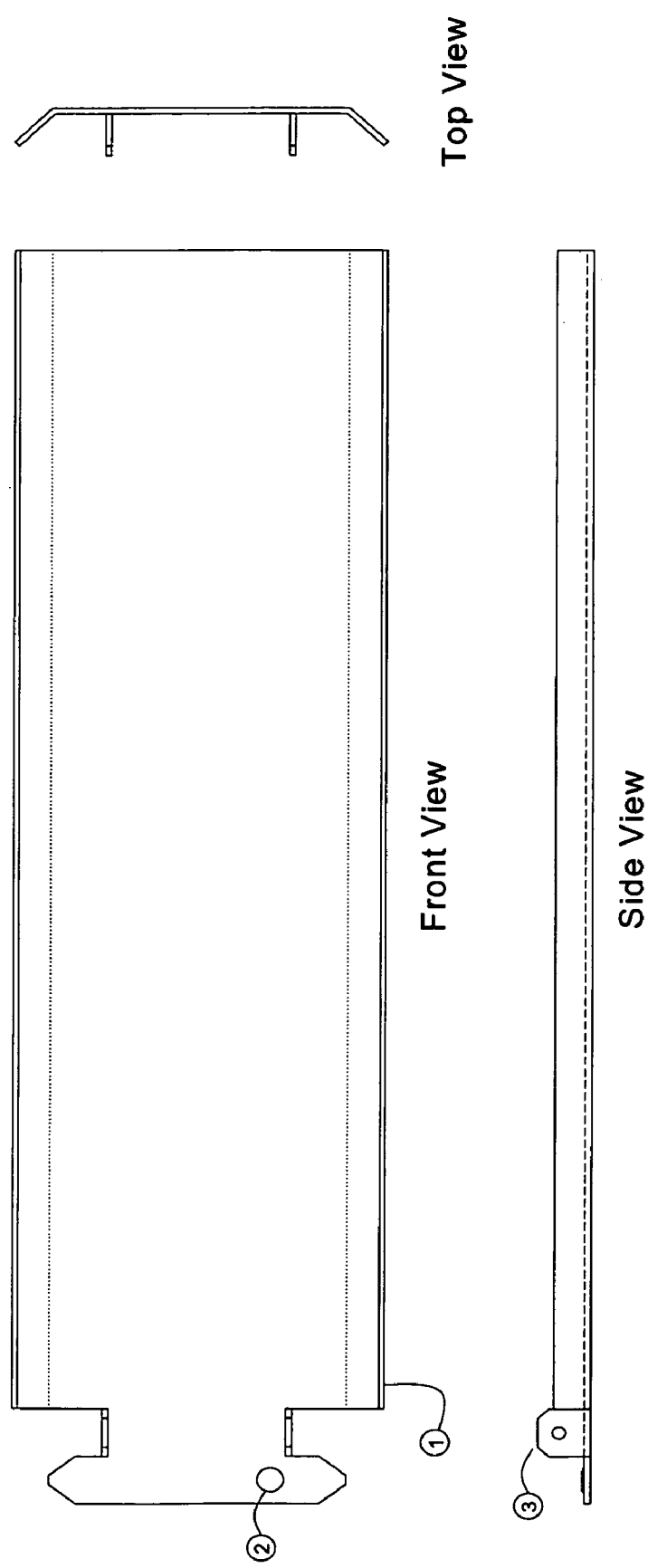
FIG. 7 is the detail diagram of the Salt flapper and sensor apparatus.

FIG. 7 shows the salt flapper, it is located inside the tank in back of the salt fill port. The salt flapper hangs down inside the tank from Hinge 3 when there is no salt in the system. On the top of the flapper contains a magnet 2. When salt pellets are poured into the tank the salt flapper is pushed back and the magnet is moved away from the sensor. When the salt pellets melt the flapper moves down which causes the magnet to come in close proximity to the sensor. The salt flappers length is such that there is still a large amount of salt inside the container when the low salt light comes on. This allows the user many days to refill the container with salt.

Detailed Description of Gas Separator Piping Assembly

Figure 8:
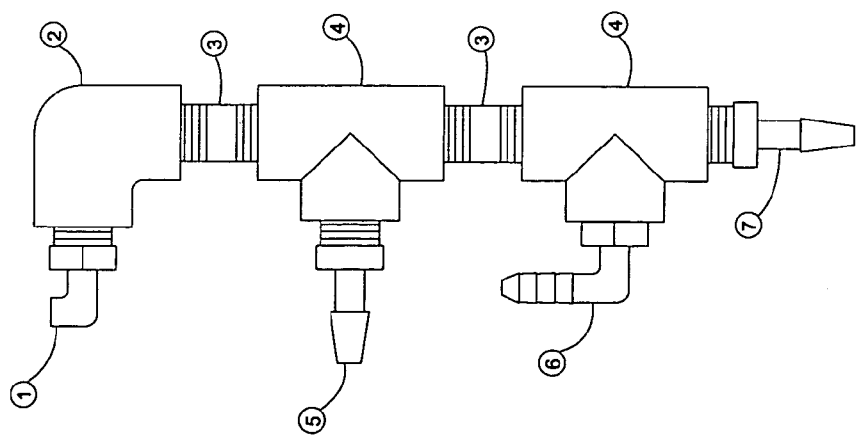
FIG. 8 is the detail diagram for the construction of the Gas separator.

FIG. 8 shows the construction detail of the gas separator assembly. Fluid enters from ¼ inch tubing barb 1. The fluid travels up through ¼ inch NPT Tee fitting 2. The catholyte used for Ph balancing, exits out the ¼ inch barb fitting 6. Additional catholyte travels up to the second Tee through the ½ inch NPT threaded pipe 4. Waste catholyte exists out ⅜ barb port 6 where a Red hose is attached to drain the waste from the system.

Hydrogen gas bubbles up though ½ NPT pipe 7 ¼ Elbow 8 and out the port 9. The port is a modified ¼ inch barb fitting. The fitting is cut off so a user cannot put a tube on the end.

Detailed Description of Ph Probe Piping Assembly

Figure 9:
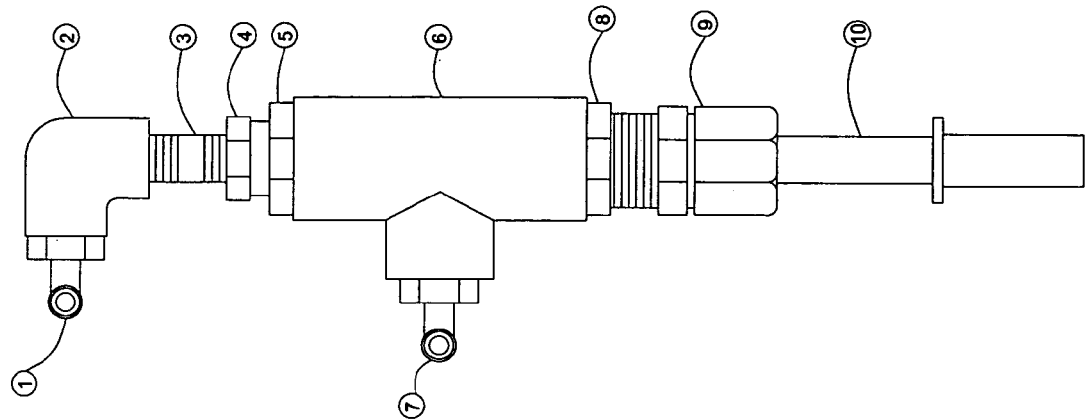
FIG. 9 is the detail diagram for the construction of the Ph probe holder.

FIG. 9 shows the construction detail of the Ph Probe assembly. The Ph probe 1 is mounted into a common ½ inch tubing connector. The tubing connector can screw down causing a seal to occur. The Tubing connector screws into a ½ inch to ¾ inch PVC Tee. The Tee assembly is mounted with the probe down. HOCL fluid enters the system into a ¼ Inch barb fitting 5 and the fluid passes by the tip of the Ph probe located in the middle of the Tee connector 4. The vertical orientation of the assembly vents any air out the top. The HOCL fluid is ported out the top through ¾ inch to ½ inch adaptor 6 to ½ inch to ½ inch adaptor 7 into the ½ inch pipe 8 to ¼ inch elbow 9 to ¼ inch barb fitting 10.

Detailed Description of Main Hydraulic Piping Assembly

Figure 10:
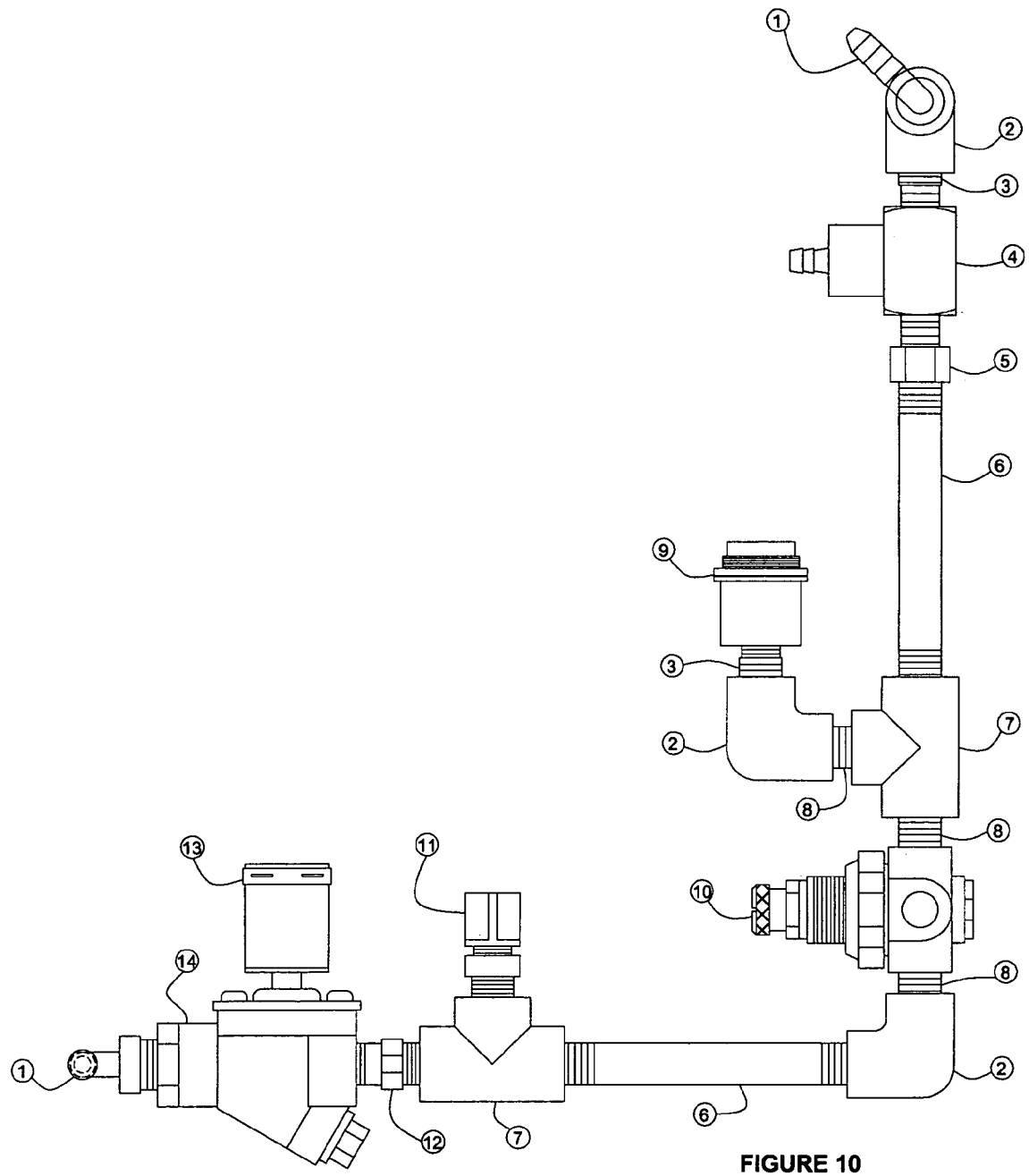
FIG. 10 is the detail diagram of the Main Hydraulic Assembly.

FIG. 10 shows the construction detail of the main hydraulic piping assembly. Water enters through the ⅜-barb fitting 1 and is connected to the water solenoid 2. When the solenoid 2 is energized through the 12-volt coil 3 the water passes to a one-way valve 4. The one-way valve insures salt water will not back into the fresh water supply. The water then flows the ¼ Tee fitting 6 and up to a ¼ inch tube fitting 5 that supplies fresh water to the float valve inside the brine tank. The water flows through pipe 7 and elbow 8 to a balanced pressure regulator 10. The pressure regulator causes the water flow rate to remain constant even if the incoming water pressure varies. The water flows out the regulator to the ¼ inch Tee fitting 16 and to the ¼ inch elbow fitting 13 and to the ¼ to ⅛-inch adaptor 14 then to the Pressure switch 15. An alternate method is to monitor the water flow through the system. The pressure switch closes and tells the control that water is present. The water flows up through pipe 17 and adaptor 18 into the venturi injector 19. Inside the injector the water is forced into a small port. As the water exits the port the water enters a large chamber. This causes a vacuum to form in the larger chamber. The brine is then sucked into the injection port 20. The meter tips that are screwed into the injector port 20 sets the concentration of brine to water. The brine and water mix now called saline travels out the injector 19 and into the ¼ inch pipe 21 and the ¼ inch elbow 22 and the ¼ inch barb fitting 23.

Detailed Description of the Operator Interface

Figure 11:
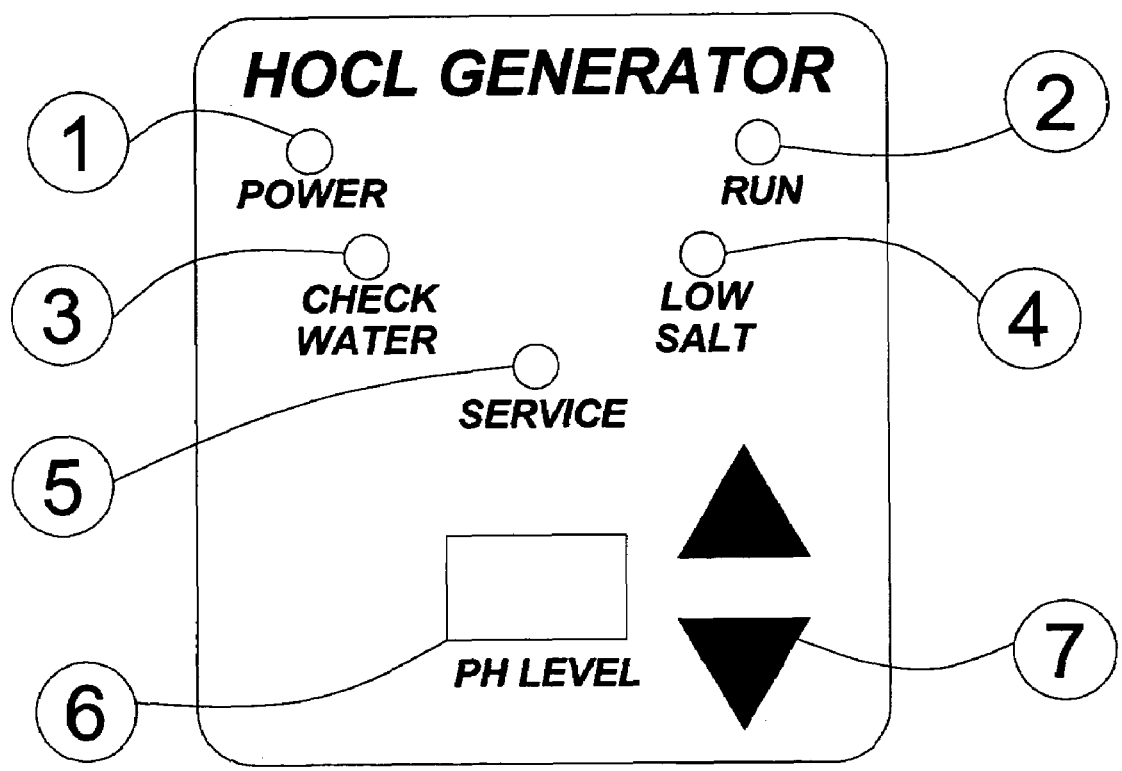
FIG. 11 is the diagram for the operator interface of the generator.

FIG. 11 shows the operator interface. The power indicator 1 shows power is on. The run indicator 2 shows the unit is generating fluid or in standby. When the check water indicator 3 is on, it indicates that there is no fresh water to the system. When the low salt indicator 4 is on the salt is low in the system. When the service indicator 5 is flashing it indicates a problem with the unit.

One flash indicates the unit is shut down due to low salt.

Two flashes indicates the unit is shut down due to a Ph problem.

Three flashes indicates the unit is shut down due to an over current condition.

Additional flashes may be implemented for other errors.

The Ph numeric display 6 shows the Ph of the output of the system. It may be adjusted by pressing the up and down arrow keys.

Detailed Description of the Construction of the Generator

Figure 6A:
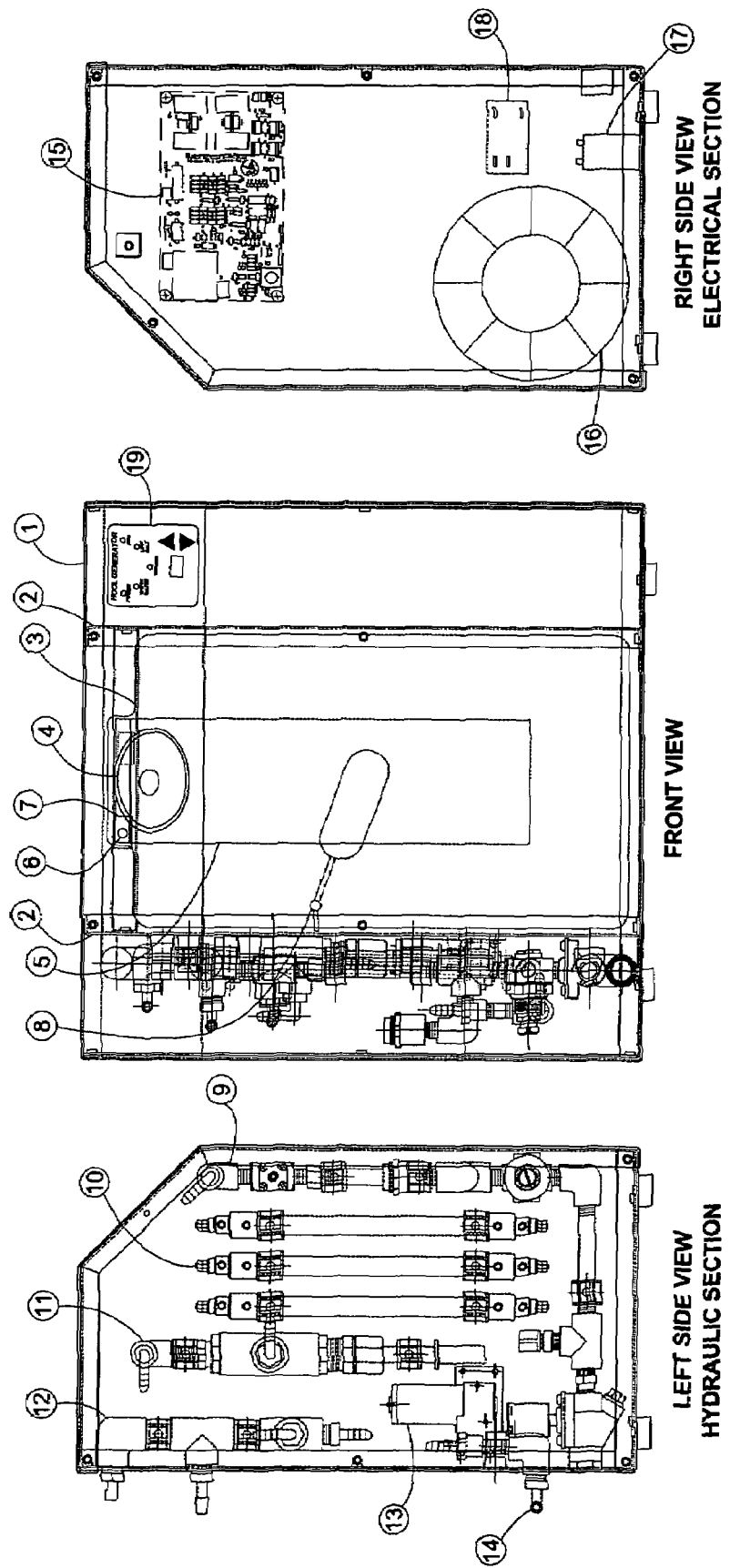
FIG. 6 is the diagram for the construction of the generator.

FIG. 6A shows the construction of the HOCL generator. The chassis is formed by plate 1 bent at a right angle to form the back and bottom. Two vertical plates 2 form the three basic sections of the generator.

The front view shows the device divided into three compartments. The Right compartment contains the power supply and the electronics control. The center compartment contains the Brine holding tank and the left compartment contains the hydraulic components. The three separate compartments protect the electronics from getting wet when hoses and leaks occur.

The center compartment contains the brine tank 3 that holds the salt tablets and fully saturated brine solution. The salt tablets are filled through the cap 4 and as the salt is placed into the tank the salt fills the bottom of the brine tank. When the salt reaches the flapper 5 it pushes the flapper back. The flapper is also used to shield the float valve 8 from becoming obstructed by the salt pellets. The magnet 6 is moved away from the magnet sensor 7. The control 15 reads the magnetic sensor and when the salt melts and the flapper rotates vertically down and the operator interface 19 displays low salt. The flapper length allows some salt pellets to be left at the bottom so the user has a long time to replace the salt pellets. If the salt pellets are not replaced after a long time the service indicator will flash and the unit will not operate.

As saturated brine solution is drawn from the tank by the venturi, fresh water is let in to the tank through the float valve 8.

The left compartment contains the hydraulics for the generator. The main hydraulic assembly 9 is mounted on the bottom and front. The cells 10 are mounted next the main hydraulic assembly. The Ph probe assembly 11 is mounted next to the cells. The gas separator 12 is mounted on the rear allowing the hydrogen gas and catholyte waste out the back of the unit. The details and the connection of each assembly are detailed above.

The right compartment of FIG. 6a shows the power supply and electronic control compartment. The control board 15, the power transformer 16 and safety relay 18, and the filter cap 17 are mounted as shown. The details and the connection of each assembly are detailed above.

Figure 6B:
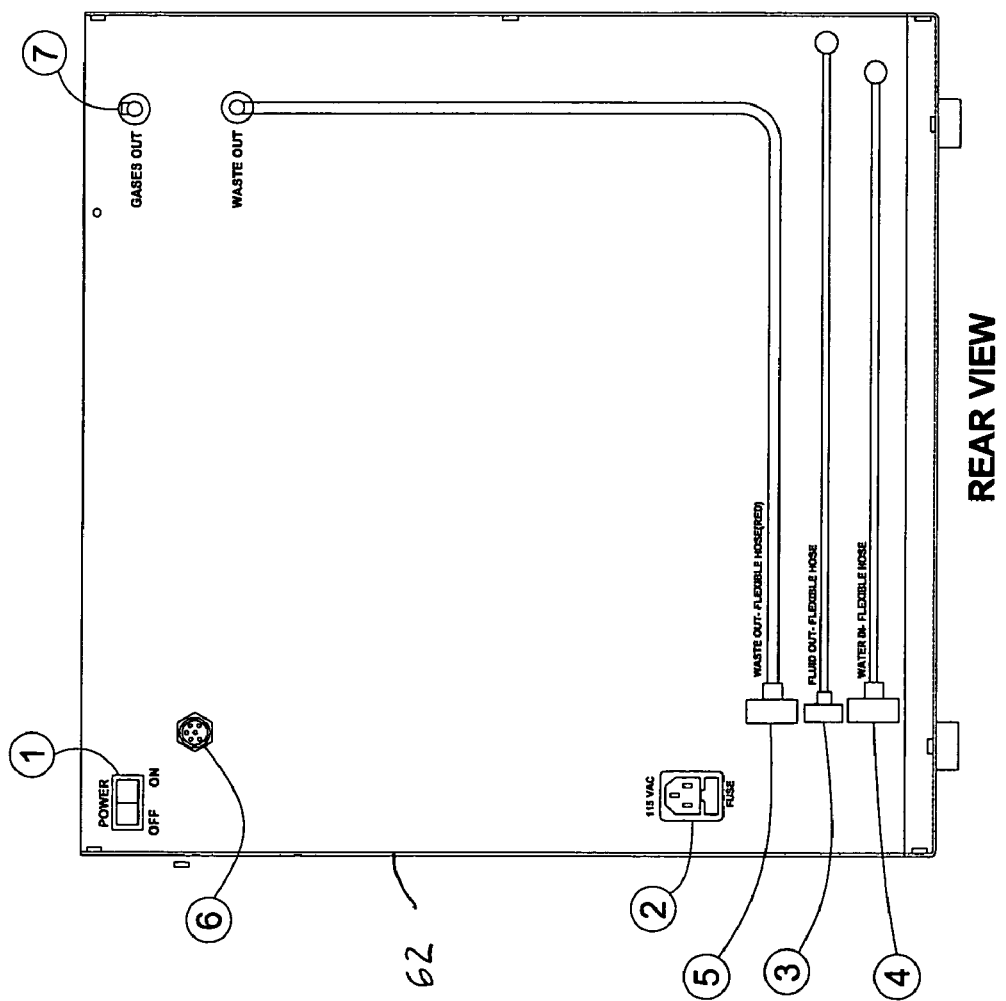

FIG. 6B shows the back of the generator. The AC power comes in the back of the unit at the power input connector and fuse holder 2. The power switch 1 turns the unit on and off. All the fluid and electrical connections are connected via screw disconnects. This allows the user to easily disconnect the unit for service or replacement. A short high-pressure hose 4 with a garden hose connection supplies the fresh water to the generator. The short hoses allows the user to easily connect the fresh water to the generator and minimizes the space required from the back of the unit and the wall. The HOCL fluid comes out at 3 and the end has a ¼ inch swivel connection. The waste fluid comes out a red hose at 5 and has a ⅜ inch swivel connection.

The generator's run signals are connected with a panel mounted connector 6.

A computer program (source code) of the operation of the microcontroller 1 of the HOCL generator in accordance with the present invention is provided herewith and is incorporated herein as part of the disclosure of the invention.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A hypochlorous acid generator, which comprises:
  a brine tank for holding salt and a brine solution, the brine tank having a water inlet in fluid communication with a source of pressurized water, a brine solution outlet and a salt fill port to allow salt to be added to the brine tank;
  an anode chamber in fluid communication with the brine solution outlet of the brine tank for receiving brine solution therefrom, and for generating anolyte, the anode chamber having an outlet for providing hypochlorous acid therefrom;
  a cathode chamber in fluid communication with the brine solution outlet of the brine tank for receiving brine solution therefrom and for generating catholyte;
  a catholyte recirculating pump in fluid communication with the cathode chamber and the anode chamber, the recirculating pump being responsive to a control signal to recirculate catholyte generated by the cathode chamber to the anode chamber;
  a solenoid valve, the solenoid valve being in fluid communication with at least the water inlet of the brine tank and the source of pressurized water, the solenoid valve being responsive to a solenoid valve signal and controlling the flow of water therethrough in response thereto, the solenoid valve being further in fluid communication with the anode and cathode chambers; and
  a pressure regulator, the pressure regulator being in fluid communication with the source of pressurized water and the anode and cathode chambers, the pressure regulator being adjustable and adjustably controlling the pressure of the water flowing therethrough, the pressure regulator being controllable by a regulator control signal and adjusting the pressure of the water flowing therethrough in response thereto.

2. A hypochlorous acid generator as defined by claim 1, which further comprises:
  a pH probe operatively coupled to the outlet of the anode chamber for detecting the pH of the hypochlorous acid provided from the anode chamber outlet, the pH probe generating a pH signal indicative of the pH of the hypochlorous acid, the control signal controlling the operation of the catholyte recirculating pump in response to the pH signal.

3. A hypochlorous acid generator as defined by claim 1, wherein the catholyte recirculating pump is a DC (direct current) motor, and wherein the hypochlorous acid generator includes a control circuit, the control circuit generating the control signal to the catholyte recirculating pump in response to the pH signal.

4. A hypochlorous acid generator as defined by claim 3, wherein the control signal is a pulse width modulated signal.

5. A hypochlorous acid generator as defined by claim 3, wherein the control circuit includes a proportional integrated derivative control loop to adjust the pulse width modulated signal.

6. A hypochlorous acid generator as defined by claim 1, wherein the brine tank includes a level sensing operative valve situated therein and in fluid communication with the water inlet of the brine tank, the level sensing operative valve controlling the flow of water into the brine tank through the water inlet in response to the level of brine solution held in the brine tank.

7. A hypochlorous acid generator as defined by claim 6, wherein the level sensing operative valve includes a float valve.

8. A hypochlorous acid generator as defined by claim 1, which further comprises:
a fluid injector, the fluid injector being in the form of a venturi and being in fluid communication with the source of pressurized water, the anode and cathode chambers, and the brine solution outlet of the brine tank, the fluid injector mixing the brine solution from the brine tank and water from the source of pressurized water to generate a water-brine solution mixture, and providing the water-brine solution mixture to the anode and cathode chambers.

9. A hypochlorous acid generator as defined by claim 1, wherein each of the anode and cathode chambers is selectively provided with power to create an electrochemical reaction within each of the anode and cathode chambers; and which further comprises a water pressure detector, the water pressure detector being in fluid communication with the source of pressurized water and the anode and cathode chambers, the water pressure detector detecting the pressure of the water flowing therethrough and generating a water pressure signal in response to the pressure of the water flowing therethrough, the power to the anode and cathode chambers being selectively provided thereto in response to the pressure signal generated by the water pressure detector.

10. A hypochlorous acid generator as defined by claim 1, wherein each of the anode and cathode chambers is selectively provided with power to create an electrochemical reaction within each of the anode and cathode chambers; and which further comprises a water flow detector, the water flow detector being in fluid communication with the source of pressurized water and the anode and cathode chambers, the water flow detector detecting the flow of water therethrough and generating a water flow signal in response to the flow of water therethrough, the power to the anode and cathode chambers being selectively provided thereto in response to the water flow signal generated by the water flow detector.

11. A hypochlorous acid generator as defined by claim 1, which further comprises:
a fluid flow restrictor, the fluid flow restrictor being in fluid communication with the fluid injector and the cathode chamber and restricting the flow of the water-brine solution mixture to the cathode chamber.

12. A hypochlorous acid generator system, which comprises:
the hypochlorous acid generator as defined by claim 1; and
at least a first holding tank and a second holding tank, the first holding tank storing a first concentration of hypochlorous acid generated by the hypochlorous acid generator, and the second holding tank storing a second concentration of hypochlorous acid generated by the hypochlorous acid generator, the first concentration of hypochlorous acid being different from the second concentration of hypochlorous acid.

13. A hypochlorous acid generator system as defined by claim 12, wherein the first holding tank has a different volume and can hold a different quantity of hypochlorous acid from that of the second holding tank.

14. A hypochlorous acid generator as defined by claim 1, which further comprises a heater in fluid communication with the source of pressurized water to maintain at a substantially constant temperature water used in the hypochlorous acid generator.

15. A hypochlorous acid generator as defined by claim 1, which further comprises a heater in fluid communication with the at least one of the anode chamber and cathode chamber to maintain at a substantially constant temperature the water-brine solution mixture.

16. A hypochlorous acid generator, which comprises:
a brine tank for holding salt and a brine solution, the brine tank having a water inlet in fluid communication with a source of pressurized water, a brine solution outlet, a salt fill port to allow salt to be added to the brine tank and a salt detector to detect if salt needs to be added to the brink tank;
an anode chamber in fluid communication with the brine solution outlet of the brine tank for receiving brine solution therefrom, and for generating anolyte, the anode chamber having an outlet for providing hypochlorous acid therefrom;
a cathode chamber in fluid communication with the brine solution outlet of the brine tank for receiving brine solution therefrom and for generating catholyte; and
a catholyte recirculating pump in fluid communication with the cathode chamber and the anode chamber, the recirculating pump being responsive to a control signal to recirculate catholyte generated by the cathode chamber to the anode chamber;
wherein the salt detector includes a pivotable elongated flapper member having a first end and an opposite second end, and a first end position sensor, the second end of the flapper member extending into the brine tank and contacting salt contained therein, the first end of the flapper member being selectively positionable in proximity to the first end position sensor, the first end position sensor detecting the position of the first end of the flapper member and generating a refill signal in response thereto, wherein the flapper member is pivotably positionable between at least a first position and a second position, the first end position sensor generating the refill signal with a first state when the flapper member is in the first position and generating the refill signal with a second state which is different from the first state when the flapper member is in the second position.

17. A hypochlorous acid generator as defined by claim 16, wherein the salt fill port of the brine tank includes a hand guard situated therein to prevent a user from touching the brine solution held by the brine tank.

18. A hypochlorous acid generator as defined by claim 16, wherein the first end position sensor includes a magnetic sensor, and wherein the first end of the flapper member includes a magnet mounted thereon.

19. A hypochlorous acid generator as defined by claim 16, which further comprises:
a fluid injector, the fluid injector being in the form of a venturi and being in fluid communication with the source of pressurized water, the anode and cathode chambers, and the brine solution outlet of the brine tank, the fluid injector mixing the brine solution from the brine tank and water from the source of pressurized water to generate a water-brine solution mixture, and providing the water-brine solution mixture to the anode and cathode chambers.

20. A hypochlorous acid generator system, which comprises:
   the hypochlorous acid generator as defined by claim 16; and
   at least a first holding tank and a second holding tank, the first holding tank storing a first concentration of hypochlorous acid generated by the hypochlorous acid generator, and the second holding tank storing a second concentration of hypochlorous acid generated by the hypochlorous acid generator, the first concentration of hypochlorous acid being different from the second concentration of hypochlorous acid.

21. A hypochlorous acid generator system, which comprises:
   a brine tank for holding salt and a brine solution, the brine tank having a water inlet in fluid communication with a source of pressurized water, a brine solution outlet and a salt fill port to allow salt to be added to the brine tank;
   an anode chamber in fluid communication with the brine solution outlet of the brine tank for receiving brine solution therefrom, and for generating anolyte, the anode chamber having an outlet for providing hypochlorous acid therefrom;
   a cathode chamber in fluid communication with the brine solution outlet of the brine tank for receiving brine solution therefrom and for generating catholyte;
   a catholyte recirculating pump in fluid communication with the cathode chamber and the anode chamber, the recirculating pump being responsive to a control signal to recirculate catholyte generated by the cathode chamber to the anode chamber;
   at least a first holding tank and a second holding tank, the first holding tank storing a first concentration of hypochlorous acid generated by the hypochlorous acid generator, and the second holding tank storing a second concentration of hypochlorous acid generated by the hypochlorous acid generator, the first concentration of hypochlorous acid being different from the second concentration of hypochlorous acid; and
   a multi-fluid sequencer diverter, the multi-fluid sequencer diverter being in fluid communication with the hypochlorous acid generator and selectively receiving the first concentration of hypochlorous acid and the second concentration of hypochlorous acid and diverting the first concentration of hypochlorous acid to the first holding tank and the second concentration of hypochlorous acid to the second holding tank.

22. A hypochlorous acid generator system as defined by claim 21,
   wherein the first holding tank has situated therein a first fluid level detector, the first fluid level detector sensing the level of hypochlorous acid in the first holding tank and generating a first holding tank level signal in response thereto, the first holding tank level signal being provided to the multi-fluid sequencer diverter;
   wherein the second holding tank has situated therein a second fluid level detector, the second fluid level detector sensing the level of hypochlorous acid in the second holding tank and generating a second holding tank level signal in response thereto, the second holding tank level signal being provided to the multi-fluid sequencer diverter;
   and wherein the multi-fluid sequencer diverter generates a run signal in response to the first holding tank level signal and the second holding tank level signal and provides the run signal to the hypochlorous acid generator, the hypochlorous acid generator being responsive to the run signal and generating hypochlorous acid in at least one of the first concentration and the second concentration in response thereto.

23. A hypochlorous acid generator system as defined by claim 22, wherein the multi-fluid sequencer diverter generates a first holding tank flow valve signal and a second holding tank flow valve signal, and wherein the system further comprises:
   a first holding tank flow valve, the first holding tank flow valve being in fluid communication with the hypochlorous acid generator and the first holding tank and controlling the flow of hypochlorous acid from the hypochlorous acid generator to the first holding tank in response to the first holding tank flow valve signal; and
   a second holding tank flow valve, the second holding tank flow valve being in fluid communication with the hypochlorous acid generator and the second holding tank and controlling the flow of hypochlorous acid from the hypochlorous acid generator to the second holding tank in response to the second holding tank flow valve signal.

24. A hypochlorous generator system as defined by claim 21, which further comprises:
   a fluid injector, the fluid injector being in the form of a venturi and being in fluid communication with the source of pressurized water, the anode and cathode chambers, and the brine solution outlet of the brine tank, the fluid injector mixing the brine solution from the brine tank and water from the source of pressurized water to generate a water-brine solution mixture, and providing the water-brine solution mixture to the anode and cathode chambers.

25. A method of generating hypochlorous acid, which comprises the, steps of:
   holding salt and a brine solution in a brine tank, the brine tank having a water inlet in fluid communication with a source of pressurized water, a brine solution outlet and a salt fill port to allow salt to be added to the brine tank;
   generating anolyte in an anode chamber, the anode chamber being in fluid communication with the brine solution outlet of the brine tank and receiving brine solution therefrom, the anode chamber having an outlet for providing hypochlorous acid therefrom;
   generating catholyte in a cathode chamber, the cathode chamber being in fluid communication with the brine solution outlet of the brine tank and receiving brine solution therefrom;
   recirculating catholyte from the cathode chamber and providing the catholyte to the anode chamber by using a catholyte recirculating pump which is in fluid communication with the cathode chamber and the anode chamber, the catholyte recirculating pump being responsive to a control signal to recirculate catholyte generated by the cathode chamber to the anode chamber;
   detecting the level of brine solution held in the brine tank using a float valve; and
   controlling the flow of water into the brine tank through the water inlet in response to the detected level of the brine solution held in the brine tank using the float valve.

26. A method of generating hypochlorous acid as defined by claim 25, which further comprises the step of:
  detecting the pH of the hypochlorous acid provided from the anode chamber outlet by using a pH probe operatively coupled to the outlet of the anode chamber, the pH probe generating a pH signal indicative of the pH of the hypochlorous acid, the control signal controlling the operation of the catholyte recirculating pump in response to the pH signal.

27. A method of generating hypochlorous acid as defined by claim 25, which further comprises the step of pulse width modulating the control signal provided to the catholyte recirculating pump.

28. A method of generating hypochlorous acid as defined by claim 27, which further comprises the step of pulse width modulating the control signal by using a proportional integrated derivative control loop.

29. A method of generating hypochlorous acid as defined by claim 25, which further comprises the step of mechanically preventing a user from reaching into the salt fill port of the brine tank to touch the brine solution held by the brine tank.

30. A method of generating hypochlorous acid as defined by claim 25, which further comprises the step of controlling the flow of water through the water inlet of the brine tank and to the anode and cathode chambers.

31. A method of generating hypochlorous acid as defined by claim 25, which further comprises the step of regulating the pressure of the water provided to the brine tank and the pressure of the fluid provided to the anode and cathode chambers.

32. A method of generating hypochlorous acid as defined by claim 31, wherein the pressure of the water provided to the brine tank and the fluid provided to the anode and cathode chambers is adjustably regulated.

33. A method of generating hypochlorous acid as defined by claim 25, which further comprises the step of:
  mixing the brine solution from the brine tank and water from a source of pressurized water to generate a water-brine solution mixture, and providing the water-brine solution mixture to the anode and cathode chambers;
  wherein the step of mixing the brine solution and water to generate a water-brine solution mixture includes the step of using a venturi.

34. A method of generating hypochlorous acid as defined by claim 33, which further comprises the step of restricting the flow of the water-brine solution mixture to the cathode chamber.

35. A method of generating hypochlorous acid as defined by claim 25, which further comprises the steps of:
  selectively providing each of the anode and cathode chambers with power to create an electrochemical reaction within each of the anode and cathode chambers; and
  detecting the pressure of the water provided by the source of pressurized water and generating in response thereto a water pressure signal, the power to the anode and cathode chambers being selectively provided thereto in response to the pressure signal.

36. A method of generating hypochlorous acid as defined by claim 25, which further comprises the steps of:
  selectively providing each of the anode and cathode chambers with power to create an electrochemical reaction within each of the anode and cathode chambers; and
  detecting the flow of water provided by the source of pressurized water and generating a water flow signal in response thereto, the power to the anode and cathode chambers being selectively provided thereto in response to the water flow signal.

37. A method of providing hypochlorous acid, which comprises the steps of:
  generating hypochlorous acid as defined by claim 25; and
  storing a first concentration of hypochlorous acid in a first holding tank and storing at least a second concentration of hypochlorous acid in at least a second holding tank, the first concentration of hypochlorous acid being different from the second concentration of hypochlorous acid.

38. A method of providing hypochlorous acid as defined by claim 37, which further comprises the steps of forming the first holding tank with a first capacity to hold a quantity of hypochlorous acid and forming the second tank with a second capacity to hold a quantity of hypochlorous acid, the first capacity of the first holding tank being different from the second capacity of the second holding tank.

39. A method of generating hypochlorous acid as defined by claim 25, which further comprises the step of maintaining at a substantially constant temperature the water used for generating the hypochlorous acid.

40. A method of generating hypochlorous acid as defined by claim 25, which further comprises the steps of:
  mixing the brine solution from the brine tank and water from a source of pressurized water to generate a water-brine solution mixture, and providing the water-brine solution mixture to the anode and cathode chambers; and
  maintaining at a substantially constant temperature the water-brine solution mixture.

41. A method of generating hypochlorous acid as defined by claim 25, which further comprises the step of maintaining at a substantially constant temperature the pressurized water of the source of pressurized water.

42. A method of providing hypochlorous acid, which comprises the steps of:
  a) generating hypochlorous acid, the step of generating hypochlorous acid comprising the sub-steps a1)-a4) of:
    a1) holding salt and a brine solution in a brine tank, the brine tank having a water inlet in fluid communication with a source of pressurized water, a brine solution outlet and a salt fill port to allow salt to be added to the brine tank;
    a2) generating anolyte in an anode chamber, the anode chamber being in fluid communication with the brine solution outlet of the brine tank and receiving brine solution therefrom, the anode chamber having an outlet for providing hypochlorous acid therefrom;
    a3) generating catholyte in a cathode chamber, the cathode chamber being in fluid communication with the brine solution outlet of the brine tank and receiving brine solution therefrom; and
    a4) recirculating catholyte from the cathode chamber and providing the catholyte to the anode chamber by using a catholyte recirculating pump which is in fluid communication with the cathode chamber and the anode chamber, the catholyte recirculating pump being responsive to a control signal to recirculate catholyte generated by the cathode chamber to the anode chamber;
  b) storing a first concentration of hypochlorous acid in a first holding tank and storing at least a second concentration of hypochlorous acid in at least a second holding tank, the first concentration of hypochlorous acid being different from the second concentration of hypochlorous acid; and c) selectively diverting the first concentration of hypochlorous acid to the first holding tank and selectively diverting the second concentration of hypochlorous acid to the second holding tank.

43. A method of providing hypochlorous acid as defined by claim 42, which further comprises the steps of:
   d) sensing the level of hypochlorous acid in the first holding tank and generating a first holding tank level signal in response thereto;
   e) sensing the level of hypochlorous acid in the second holding tank and generating a second holding tank level signal in response thereto; and
   f) generating hypochlorous acid in at least one of the first concentration and the second concentration in response to the first holding tank level signal and the second holding tank level signal.

44. A method of providing hypochlorous acid as defined by claim 43, which further comprises the steps of:
   g) controlling the flow of hypochlorous acid to the first holding tank in response to the first holding tank level signal; and
   h) controlling the flow of hypochlorous acid to the second holding tank in response to the second holding tank level signal.

45. A method of providing hypochlorous acid as defined by claim 42, which further comprises the step of:
   mixing the brine solution from the brine tank and water from a source of pressurized water to generate a water-brine solution mixture, and providing the water-brine solution mixture to the anode and cathode chambers;
   wherein the step of mixing the brine solution and water to generate a water-brine solution mixture includes the step of using a venturi.

* * * * *